(12) United States Patent
Kawakami

(10) Patent No.: US 12,530,769 B2
(45) Date of Patent: Jan. 20, 2026

(54) METHOD OF GENERATING QUALITY CONTROL INFORMATION, APPARATUS FOR GENERATING QUALITY CONTROL INFORMATION, AND PROGRAM

(71) Applicant: SYSMEX CORPORATION, Kobe (JP)

(72) Inventor: Hajimu Kawakami, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 400 days.

(21) Appl. No.: 18/178,569

(22) Filed: Mar. 6, 2023

(65) Prior Publication Data

US 2023/0289962 A1  Sep. 14, 2023

(30) Foreign Application Priority Data

Mar. 9, 2022 (JP) .................... 2022-035791
Mar. 9, 2022 (JP) .................... 2022-035792

(51) Int. Cl.
*G06T 7/90* (2017.01)
*G01N 1/30* (2006.01)
(Continued)

(52) U.S. Cl.
CPC .......... *G06T 7/0012* (2013.01); *G01N 1/30* (2013.01); *G01N 33/96* (2013.01); *G01N 35/00613* (2013.01); *G06T 7/90* (2017.01); *G01N 2496/05* (2013.01); *G06T 2200/24* (2013.01); *G06T 2207/20092* (2013.01); *G06T 2207/30024* (2013.01); *G06T 2207/30168* (2013.01)

(58) Field of Classification Search
CPC ............... G06T 7/0012; G06T 7/90; G06T 2007/30024; G06T 2207/30168; G01N 33/96; G01N 35/00613; G01N 2496/05
USPC ................................... 382/128, 134
See application file for complete search history.

(56) References Cited

U.S. PATENT DOCUMENTS 5,380,663 A    1/1995  Schwartz et al.
2008/0114559 A1  5/2008  Yamaguchi et al.
(Continued)

FOREIGN PATENT DOCUMENTS

EP   2211165 A2   7/2010
EP   3792825 A1   3/2021
(Continued)

OTHER PUBLICATIONS

Kestler H. A. et al: "Klassifikation Zytologischer Abstriche Der Zervix Mit Neuronalen Verfahren", Jan. 1, 1999, pp. 17-24, vol. 44, No. 1/02, Biomedizinische Tech Nik, Walter De Gruyter GMBH, DE; Cited in the EESR mailed on Jun. 30, 2023 in a counterpart Eueopean patent application.
(Continued)

*Primary Examiner* — Jamares Q Washington
(74) *Attorney, Agent, or Firm* — METROLEX IP LAW GROUP, PLLC; Robert L. Scott, Esq.

(57) ABSTRACT

A method of generating smear quality control information according to an embodiment may include: obtaining a plurality of image data from a plurality of smears, respectively; obtaining, from the plurality of image data, feature values each of which reflects a staining state of each smear; and generating quality control information based on the feature values.

19 Claims, 24 Drawing Sheets

(51) Int. Cl.
  *G01N 33/96* (2006.01)
  *G01N 35/00* (2006.01)
  *G06T 7/00* (2017.01)

(56) References Cited

U.S. PATENT DOCUMENTS

| | | | |
|---|---|---|---|
| 2010/0104169 | A1 | 4/2010 | Yamada |
| 2010/0183216 | A1* | 7/2010 | Yamada ............ G01N 15/1433 382/134 |
| 2014/0023266 | A1 | 1/2014 | Bertheau et al. |
| 2021/0011018 | A1 | 1/2021 | Hart et al. |

FOREIGN PATENT DOCUMENTS

| | | |
|---|---|---|
| EP | 4086626 A1 | 11/2022 |
| JP | 2010-169484 A | 8/2010 |
| JP | 2019-035624 A | 3/2019 |
| WO | 2021134664 A1 | 7/2021 |

OTHER PUBLICATIONS

Fong Amaris W. M. et al: "Image features for quality analysis of thick blood smears employed in malaria diagnosis", Mar. 5, 2022, vol. 21, No. 1, Malaria Journal; Cited in the EESR mailed on Jul. 12, 2023 in a counterpart European patent application.

Shakhawat Hossain et al: "Automatic Quality Evaluation of Whole Slide Images for the Practical Use of Whole Slide Imaging Scanner", Oct. 1, 2020, vol. 8, No. 4, ITE Trans. on MTA; Cited in the EESR mailed on Jul. 12, 2023 in a counterpart European patent application.

Noriaki Hashimoto et al: "Referenceless image quality evaluation for whole slide imaging", Mar. 16, 2012, vol. 3, No. 1, Journal of Pathology Informatics; Cited in the EESR mailed on Jul. 12, 2023 in a counterpart European patent application.

Extended European search report (EESR) mailed on Jun. 30, 2023 in a counterpart European patent application.

Extended European search report (EESR) mailed on Jul. 12, 2023 in a counterpart European patent application.

Tatsumi et al. "An Attempt to Control the Accuracy of Papanicolaou Staining ~Creation of Daily Difference Chart by Numerical Analysis of Colors ~", Journal of the Japanese Society of Clinical Cytology (Web), May 29, 2020, p. 2-88, p. 342, No. 59, Supplement No. 1.

Office Action issued on Oct. 23, 2025 in a related U.S. Appl. No. 18/178,598.

* cited by examiner

FIG. 12

| Feature Value Summary | Notation | Detail |
|---|---|---|
| Mean value of luminance value of red component of red blood cell (R value) | RBC Color R | The value averaged over the entire smear image based on the mean value of the R-channel of the red blood cell region per image (redcell_r_mean) |
| Mean value of luminance value of green component of red blood cell (G value) | RBC Color G | The value averaged over the entire smear image based on the mean value of the G-channel of the red blood cell region per image (redcell_g_mean) |
| Mean value of luminance value of blue component of red blood cell (B value) | RBC Color B | The value averaged over the entire smear image based on the mean value of the B-channel of the red blood cell region per image (redcell_b_mean) |
| Mean value of hue value of red blood cell (H value) | RBC Color H | The value averaged over the entire smear image based on the mean value of the H-channel of the red blood cell region per image (redcell_h_mean) |
| Mean value of saturation value of red blood cell (S value) | RBC Color S | The value averaged over the entire smear image based on the mean value of the S-channel of the red blood cell region per image (redcell_s_mean) |
| Mean value of brightness value of red blood cell (V value) | RBC Color V | The value averaged over the entire smear image based on the average of the V-channel of the red blood cell region per image (redcell_v_mean) |
| HSV value of red blood cell (Redness index of red blood cell) | RBC Redness Index | The value calculated from the mean value of H, S, and V calculated for the entire smear image |

FIG. 14

| Feature Value Summary | Notation | Detail |
|---|---|---|
| Mean value of luminance value of red component of cytoplasm region of white blood cell (R value) | [White blood cell type] Cytoplasm Color R | The value obtained by taking the mean value (cell_r_mean) of the R-channel in the cytoplasm region for each image, and by taking the average of the [white blood cell type] over the entire smear image |
| Mean value of luminance value of green component of cytoplasm region of white blood cell (G value) | [White blood cell type] Cytoplasm Color G | The value obtained by taking the mean value (cell_g_mean) of the G-channel in the cytoplasm region for each image, and by taking the average of the [white blood cell type] over the entire smear image |
| Mean value of luminance value of blue component of cytoplasm region of white blood cell (B value) | [White blood cell type] Cytoplasm Color B | The value obtained by taking the mean value (cell_b_mean) of the B-channel in the cytoplasm region for each image, and by taking the average of the [white blood cell type] over the entire smear image |
| Mean value of hue value of cytoplasm region of white blood cell (H value) | [White blood cell type] Cytoplasm Color H | The value obtained by taking the mean value (cell_h_mean) of the H-channel in the cytoplasm region for each image, and by taking the average of the [white blood cell type] over the entire smear image |
| Mean value of saturation value of cytoplasm region of white blood cell (S value) | [White blood cell type] Cytoplasm Color S | The value obtained by taking the mean value (cell_s_mean) of the S-channel in the cytoplasm region for each image, and by taking the average of the [white blood cell type] over the entire smear image |
| Mean value of brightness value of cytoplasm region of white blood cell (V value) | [White blood cell type] Cytoplasm Color V | The value obtained by taking the mean value (cell_v_mean) of the V-channel in the cytoplasm region for each image, and by taking the average of the [white blood cell type] over the entire smear image |
| Mean value of luminance value of red component of nuclear region of white blood cell (R value) | [White blood cell type] Nuclear Color R | The value obtained by taking the mean value (nuclear_r_mean) of the R-channel in the nuclear region for each image, and by taking the average of the [white blood cell type] over the entire smear image |
| Mean value of luminance value of green component of nuclear region of white blood cell (G value) | [White blood cell type] Nuclear Color G | The value obtained by taking the mean value (nuclear_g_mean) of the G-channel in the nuclear region for each image, and by taking the average of the [white blood cell type] over the entire smear image |
| Mean value of luminance value of blue component of nuclear region of white blood cell (B value) | [White blood cell type] Nuclear Color B | The value obtained by taking the mean value (nuclear_b_mean) of the B-channel in the nuclear region for each image, and by taking the average of the [white blood cell type] over the entire smear image |
| Mean value of hue value of nuclear region of white blood cell (H value) | [White blood cell type] Nuclear Color H | The value obtained by taking the mean value (nuclear_h_mean) of the H-channel in the nuclear region for each image, and by taking the average of the [white blood cell type] over the entire smear image |
| Mean value of saturation value of nuclear region of white blood cell (S value) | [White blood cell type] Nuclear Color S | The value obtained by taking the mean value (nuclear_s_mean) of the S-channel in the nuclear region for each image, and by taking the average of the [white blood cell type] over the entire smear image |
| Mean value of brightness value of nuclear region of white blood cell (V value) | [White blood cell type] Nuclear Color V | The value obtained by taking the mean value (nuclear_v_mean) of the V-channel in the nuclear region for each image, and by taking the average of the [white blood cell type] over the entire smear image |
| Mean value of granule index of white blood cell | [White blood cell type] Granule Index | The value obtained by taking the average of the sum of the number of regions recognized as a granule in the cytoplasm region per image (granule_count) for the [white blood cell type] over the entire smear image |

FIG. 15

| Feature Value Summary | Notation | Detail |
|---|---|---|
| Mean value of cell diameter of blood cell | [Blood cell type] Diameter | The Cell Diameter derived for each image is averaged for [blood cell type] over the entire smear image. |
| Mean value of nuclear diameter of blood cell | [Blood cell type] Nuclear Diameter | The Nuclear Diameter derived for each image is averaged for [blood cell type] over the entire smear image. |
| Mean value of N/C ratio of blood cell | [Blood cell type] N/C | The N/C ratio derived for each image is averaged for [blood cell type] over the entire smear image.<br><br>*N/C ratio: nuclear_diameter/cell_diameter |
| Mean value of cytoplasm area of blood cell | [Blood cell type] Area of cytoplasm portion of target cell ($\mu m^2$) | Calculate from the number of pixels in the cytoplasm region. Unit is $\mu m^2$ |
| Mean value of circularity (roundness ratio) of blood cell | [Blood cell type] circularity | The circularity calculated from the following formula for each image is averaged for [blood cell type] over the entire smear image.<br><br>$4 \times \pi \times$(area of cell region of [blood cell type])/(square of length of cell perimeter of [blood cell type]) |
| Mean value of circularity (roundness ratio) of nucleus | [Blood cell type] nuclear circularity | The nuclear circularity calculated from the following formula for each image is averaged for [blood cell type] over the entire smear image.<br><br>$4 \times \pi \times$(area of nuclear region of [blood cell type])/(square of length of nuclear perimeter of [blood cell type]) |

METHOD OF GENERATING QUALITY CONTROL INFORMATION, APPARATUS FOR GENERATING QUALITY CONTROL INFORMATION, AND PROGRAM

CROSS REFERENCE TO RELATED APPLICATIONS

This application claims priority from prior Japanese Patent Applications No. 2022-035791 filed on Mar. 9, 2022 and No. 2022-035792 filed on Mar. 9, 2022, the entire contents of each of which are incorporated herein by reference.

BACKGROUND

The disclosure may relate to a method of generating quality control information, an apparatus for generating quality control information, and a program.

A method of performing quality control of a smear preparing apparatus based on a staining state of a smeared specimen (a smear) is known. For example, in Japanese Patent Publication No. 2010-169484 (Patent Document 1), a system is described that uses a luminance value of a specific color component of nuclear regions in a blood cell image of a smear as a feature value reflecting a staining state of blood cells in the smear, compares the feature value with a predetermined lower limit reference value and a predetermined upper limit reference value, and notifies an occurrence of a staining abnormality when the feature value is the predetermined lower limit reference value or below or the predetermined upper limit reference value or above.

SUMMARY

Smearing/staining conditions for such a smear include a reagent and an apparatus that are used to prepare the smear, and conditions of processes (e.g., a smearing condition, pH of a staining solution, a temperature of the staining solution, and a staining time), and affects a staining state of the smear. The smearing/staining conditions may differ from one laboratory to another or from one region or country (hereinafter referred to as "region or the like") to another.

In the quality control method described in Patent Document 1, the feature value reflecting the staining state of the blood cells in the smear is compared with the predetermined lower limit reference value and the predetermined upper limit reference value, and the occurrence of the staining abnormality is notified. However, in Patent Document 1, it is not considered that the smearing/staining conditions differ from one laboratory to another or from one region or the like to another.

An object of the disclosure is to provide a method of generating smear quality control information, a generating apparatus for generating smear quality control information, and a program that are adapted to the fact that smearing/staining conditions differ from one laboratory to another or from one region or the like to another.

An aspect of the disclosure may be a method of generating smear quality control information that may include: obtaining a plurality of image data from a plurality of smears, respectively; obtaining, from the plurality of image data, feature values each of which reflects a staining state of each smear; and generating quality control information based on the feature values.

BRIEF DESCRIPTION OF DRAWINGS

FIG. 12 is a diagram illustrating feature values that reflect a staining state of red blood cells.

FIG. 14 is a diagram illustrating feature values that reflect a staining state of white blood cells.

FIG. 15 is a diagram illustrating feature values that reflect forms of blood cells.

DETAILED DESCRIPTION

Figure 5:
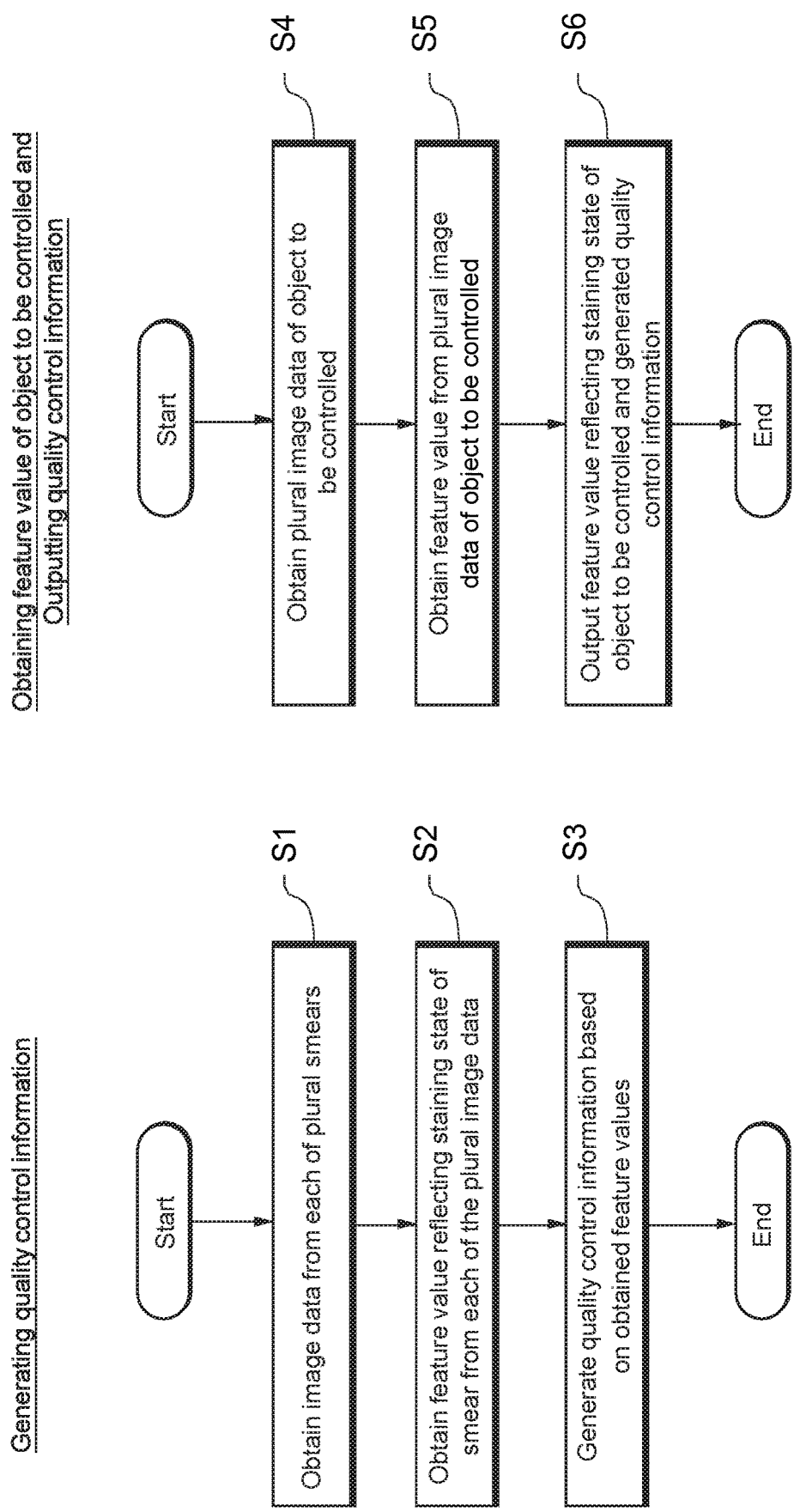
FIG. 5 is flowcharts illustrating a process of generating quality control information and a process of outputting feature values reflecting staining states of the smears which are objects to be controlled and the generated quality control information.

As illustrated in FIG. 5, a method of generating quality control information according to a first aspect is a method of generating smear quality control information that includes: (S1) obtaining a plurality of image data from a plurality of smears, respectively; (S2) obtaining, from the plurality of image data, feature values each of which reflects a staining state of each smear; and (S3) generating quality control information based on the feature values.

According to the method of generating quality control information of the first aspect, the feature values reflecting the staining states of the smears are obtained from the plurality of obtained image data, and the quality control information is generated based on the feature values. Therefore, the method of generating quality control information according to the first aspect can generate smear quality control information adapted to the fact that smearing/staining conditions differ from one laboratory to another or from one region or the like to another.

Figure 1:
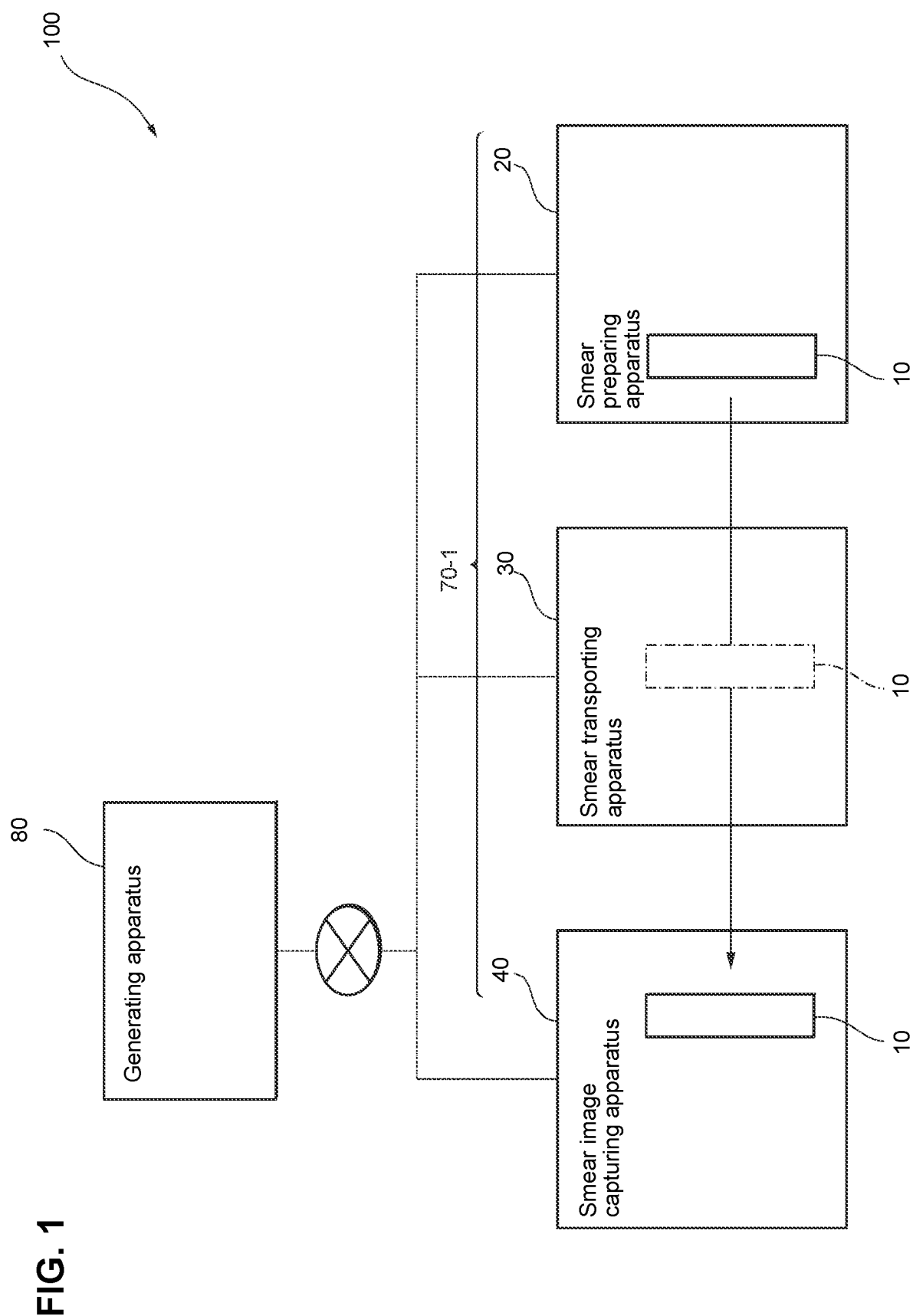
FIG. 1 is a schematic diagram illustrating an overview of a generating system.
Figure 4:
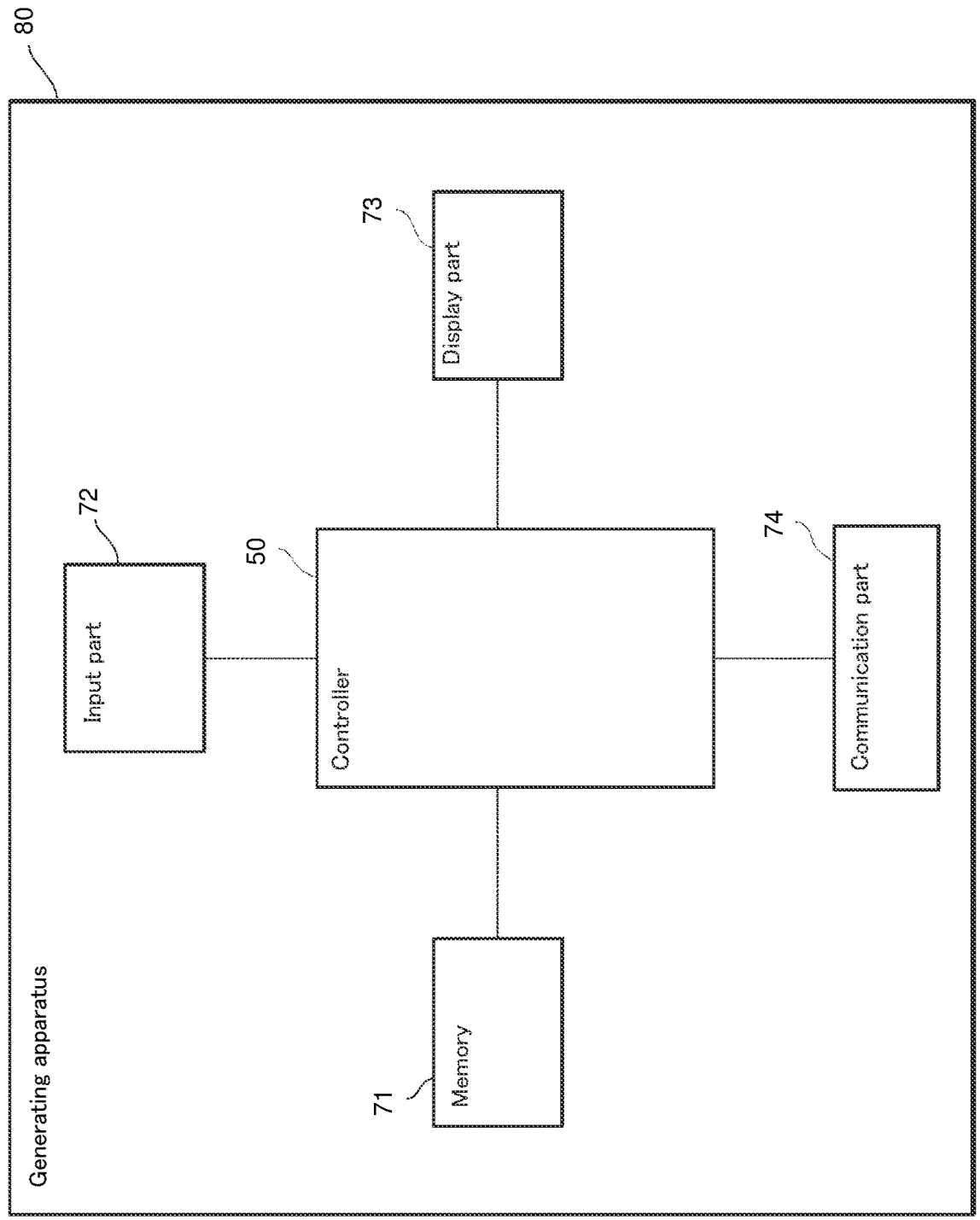
FIG. 4 is a block diagram illustrating a configuration of a generating apparatus.

As illustrated in FIG. 1 and FIG. 4, a generating apparatus (80) for generating quality control information according to a second aspect is a system that generates smear quality control information and includes a controller (50), wherein the controller (50) is configured to obtain a plurality of image data from a plurality of smears, respectively, obtain from the plurality of image data feature values each of which reflects a staining state of each smear, and generates quality control information based on the feature values.

According to the generating apparatus (80) for generating the quality control information according to the second aspect, the controller (50) of the generating apparatus (80) obtains the feature values reflecting the staining states of the smears from the plurality of obtained image data, and generates the quality control information based on the feature values. Therefore, the generating apparatus for generating quality control information according to the second aspect can generate smear quality control information adapted to the fact that smearing/staining conditions differ from one laboratory to another or from one region or the like to another.

As illustrated in FIG. 1 and FIG. 4, a third aspect is a non-transitory computer-readable storage medium storing a program that causes a generating apparatus for generating smear quality control information to perform operations comprising: obtaining a plurality of image data from a plurality of smears, respectively; obtaining from the plurality of image data feature values each of which reflects a staining state of each smear; and generating quality control information based on the feature values.

According to the program of the third aspect, the feature values which reflect the staining states of the smears are obtained from the plurality of obtained image data, and the quality control information is generated based on the feature values. Therefore, the program according to the third aspect can generate smear quality control information adapted to the fact that smearing and staining conditions differ from one laboratory to another or from one region or the like to another.

According to at least one of the above aspects, it is possible to generate smear quality control information adapted to the fact that smearing/staining conditions differ from one laboratory to another or from one region or the like to another.

One or more embodiments of the disclosure are described with reference to the drawings below. The same symbols are designated to the same elements, and a duplicate description is omitted. Also, the positional relationships such as up, down, left, right, etc. are based on the positional relationships illustrated in the drawings, unless otherwise specified. Furthermore, the dimensional ratios in the drawings are not limited to the ratios illustrated in the figures. Moreover, the following embodiments are examples to describe the present invention, and the present invention is not limited to the embodiments.

(Overview of Generating System)

Referring to FIG. 1, an overview of a generating system 100 for generating quality control information for a smeared specimen (a smear) of blood collected from a subject is described. FIG. 1 is a schematic diagram illustrating the overview of the generating system 100.

The generating system 100 for generating quality control information comprises a testing system 70-1 including a smear preparing apparatus 20, a smear transporting apparatus 30, a smear image capturing apparatus 40, and a generating apparatus 80 for generating quality control information.

The testing system 70-1 is a system configured to prepare smear slides 10 by the smear preparing apparatus 20, transport the prepared smear slides 10 to the smear image capturing apparatus 40 by the smear transporting apparatus 30, and capture images of the prepared smear slides 10 by the smear image capturing apparatus 40. The testing system 70-1 is provided, for example, in one testing facility (a testing facility A). The generating apparatus 80 is installed at a facility of a provider of the smear image capturing apparatus 40 (e.g., a manufacturer of the smear image capturing apparatus 40), and is connected via a network to the smear preparing apparatus 20, the smear transporting apparatus 30, and the smear image capturing apparatus 40 of the testing system 70-1. The generating apparatus 80 obtains the captured image data of the smear slides 10, obtains from the image data feature values each of which reflect a staining state of each smear, and generates quality control information for the smears based on the obtained feature values.

The feature value of the smear is quantified information that reflects the staining state of the smear in the image data that reflects regions of blood cells in the blood. Also, the feature value, for example, includes color information of red blood cells, and is generated by obtaining a color index of an intracellular region for each cell from each of a plurality of image data, and quantifying the staining state in the smear of each of the plurality of image data.

The quality control information is a median or a mean value that is statistically calculated from the plurality of feature values. Also, the quality control information includes at least one of an upper limit value and a lower limit value that is, for example, ±2 SD (Standard Deviation) or ±3 SD with respect to the median or the mean value. In addition to the median or the mean value, the quality control information may use, for example, a value based on a moving average of the plurality of feature values.

By generating the quality control information based on the feature values of the plurality of smears, a feature value of a smear which is an object to be controlled (managed) can be compared against the generated quality control information to ascertain whether there is a problem with the staining state of the smear to be controlled. In such cases, the quality of the smear to be controlled can be assured based on the quality control information.

The timing of generating the quality control information is arbitrary and may be, for example, every day, every few days, every week, or every month, or at a timing when a lot of staining solution used for the preparation of the smears is changed. Also, the timing of obtaining the feature value reflecting the staining state of the smear to be controlled is arbitrary and may be, for example, every day, every few days, every week, or every month, or every few hours.

Figure 2A:
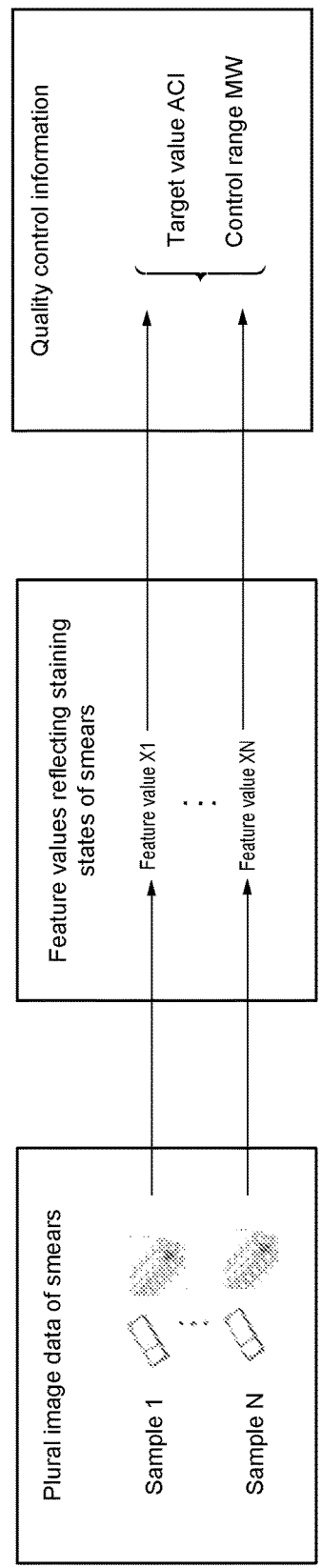
FIG. 2A is a diagram illustrating an overview of a process of generating quality control information.
Figure 2B:
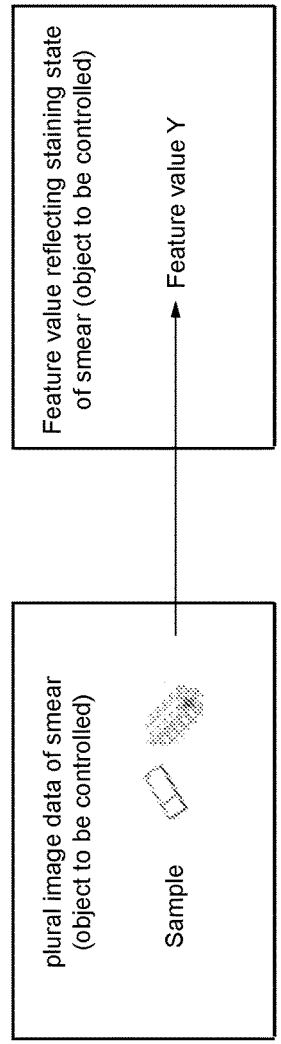
FIG. 2B is a diagram illustrating an overview of a process of obtaining a feature value of a smear to be controlled.

FIGS. 2A and 2B are diagrams illustrating overviews of a process of generating quality control information and a process of obtaining a feature value of a smear to be controlled.

As illustrated in FIG. 2A, as a process of generating quality control information, the generating apparatus 80 illustrated in FIG. 1 obtains image data that reflect respective regions of blood cells in blood from each of a plurality of smears (e.g., Sample 1, . . . , and Sample N), and obtains feature values X1, . . . , and XN that reflect staining states of the plurality of smears from the plurality of image data, respectively. The generating apparatus 80 generates, for example, a target value ACI and/or a control width MW (management width) based on an upper limit value and a lower limit value as the quality control information. The target value ACI is calculated from a mean value of the plurality of feature values X1, . . . , and XN that are obtained. For the control width MW, the upper limit value and the lower limit value are calculated from ±2 SD (Standard Deviation) to the target value ACI. The quality control information is generated, for example, on a daily basis from the image data of all the smears imaged on that day.

As illustrated in FIG. 2B, as a process of obtaining a feature value Y of a smear to be controlled, the generating apparatus 80 obtains image data that reflect regions of blood cells in blood from the smear to be controlled (e.g., Sample), and obtains the feature value Y that reflects a staining state of the smear to be controlled from the obtained image data. As the generating apparatus 80 outputs the feature value Y of the smear to be controlled, with respect to, for example, the target value ACI and the control width MW, which are the quality control information, a user can perform the quality control on the smear to be controlled with reference to the quality control information. The feature value that reflects the staining state of the smear to be controlled, for example, is obtained from the image data of at least one of all the smears imaged on that day.

Figure 3:
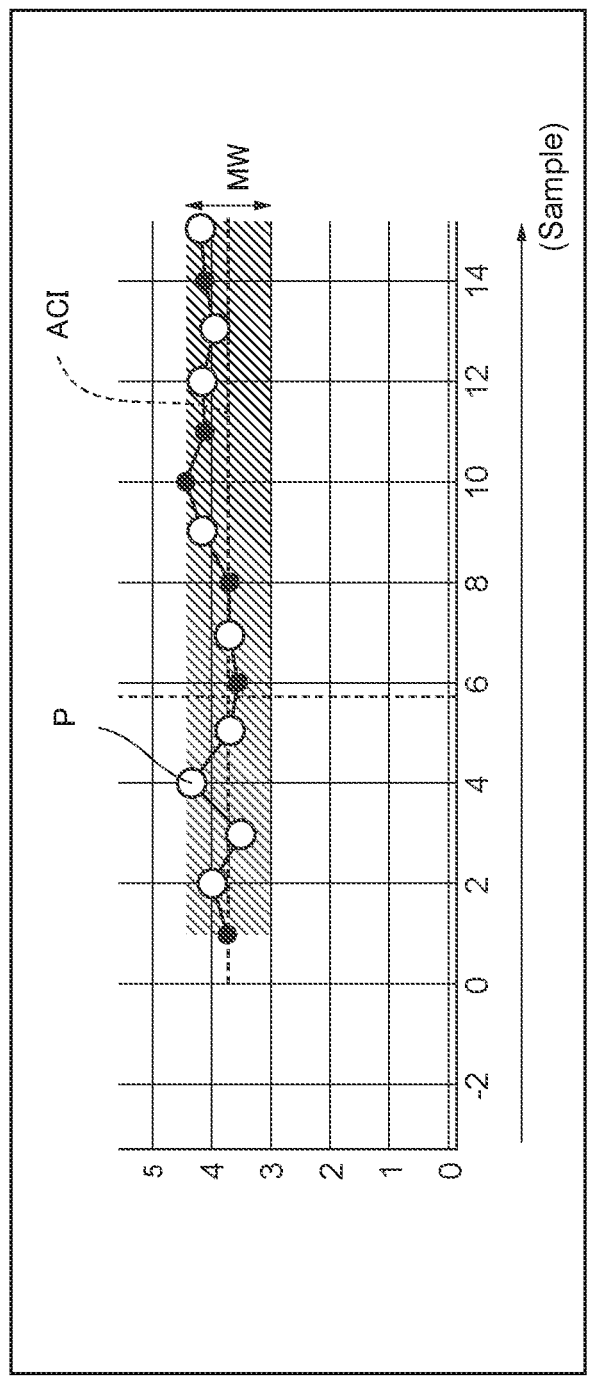
FIG. 3 is a diagram illustrating an overview of an output screen based on a process of generating quality control information and a process of obtaining feature values of smears to be controlled.

FIG. 3 is a diagram illustrating an overview of an output screen based on the process of generating the quality control information and the process of obtaining the feature values Y of the smears to be controlled in FIGS. 2A and 2B. An example illustrated in FIG. 3 is an example of the output screen outputting the generated quality control information and the obtained feature values Y reflecting the staining states of the smears to be controlled. For example, the target value ACI and the control width MW, which are the quality control information, are output. In addition, plots P corresponding to the feature values Y reflecting the staining states of the smears to be controlled are output. By visually understanding the relationship between the quality control information, i.e., the target ACI and the control width MW, and the output plots P, the user can easily perform quality control on the smears to be controlled. Here, a horizontal axis ("Sample") in the output graph indicates the smears to be controlled, and for example, indicates that a smear of Sample 2 and a smear of Sample 4 are different smears. A vertical axis indicates the feature value that reflects the staining state of each smear to be controlled.

The subjects are primarily humans, but may be other animals other than humans. The testing system 100, for example, performs a clinical testing or an analysis for a medical research of a sample collected from a patient. The sample is a sample of biological origin. The sample of biological origin is, for example, liquid such as blood (whole blood, serum, or plasma), urine, or other body fluid collected from a test subject, or liquid obtained by performing a predetermined pretreatment on the collected body fluid or blood. Also, the sample may be, for example, a piece of tissue or cells of the subject, etc. other than liquid.

The smear preparing apparatus 20 is an apparatus configured to perform a smearing process of smearing a sample on a slide and a staining process of staining the smeared sample on the slide 10. The smear preparing apparatus 20 aspirates a specimen as the sample, drops/smears the specimen onto the slide, and stains the specimen to thereby obtain the smear slide 10.

The smear transporting apparatus 30 is configured to receive the smear slide 10 prepared by the smear preparing apparatus 20 and transport the smear slide 10 to the smear image capturing apparatus 40. Also, the smear transporting apparatus 30 is configured, after capturing an image of the smear slide 10 by the smear image capturing apparatus 40, to receive and store the smear slide 10.

The smear image capturing apparatus 40 is configured to capture the image of the smear slide 10 transported by the smear transporting apparatus 30.

Note that the testing system 70-1 may include other devices. For example, the testing system 70 may include an analyzer that performs an analysis of a sample (e.g., a hematology analyzer that performs classification and counting of blood cells in the sample) and a transporting apparatus that transports a container in which the sample is contained.

Note that the testing system 70-1 including the smear preparing apparatus 20, the smear transporting apparatus 30, and the smear image capturing apparatus 40 is described, for example, in US Patent Application Publication No. 2019/0049474. US Patent Application Publication No. 2019/0049474 is hereby incorporated herein by reference.

FIG. 4 is a block diagram illustrating an example of a configuration of the generating apparatus 80. As illustrated in FIG. 4, the generating apparatus 80 includes a controller 50, a storage 71, an input part 72, a display part 73, and a communication part 74.

The controller 50 is provided with a CPU that, by way of example, executes information processing to generate the quality control information for the smears. Also, the controller 50 is capable of communicating via the communication part 74 with the smear preparing apparatus 20, the smear transporting apparatus 30, and the smear image capturing apparatus 40 illustrated in FIG. 1. The storage 71 is provided with a memory that records, by way of example, information for executing information processing of the controller 50 and information generated by executing the information processing. The input part 72 is, for example, a keyboard, a mouse, or the like and the display part 73 is, for example, a liquid crystal display, an organic EL display, or the like.

FIG. 5 illustrates flowcharts illustrating a process of generating quality control information and a process of outputting a feature value reflecting a staining state of a smear which is an object to be controlled and the generated quality control information.

As illustrated in the process of generating the quality control information in FIG. 5, the controller 50 of the generating apparatus 80 illustrated in FIG. 4 obtains image data from each of a plurality of smears (step S1). The controller 50 obtains, from each of the plurality of image data, a feature value that reflects a staining state of each smear (step S2). The controller 50 generates smear quality control information based on the obtained feature values (step S3). By performing steps S1 to S3, the controller 50 generates the quality control information.

As illustrated in the processes outputting of the feature value reflecting the staining state of the smear which is the object to be controlled and the generated quality control information in FIG. 5, the controller 50 obtains a plurality of image data of the object to be controlled (step S4). The controller 50 obtains the feature value of the object to be controlled from the plurality of image data (step S5). The controller 50 outputs, on the display part 73, the feature value reflecting the staining state of the smear which is the object to be controlled and the generated quality control information (step S6). By performing the steps of S4 to S6, the controller 50 outputs the feature value that reflect the staining state of the smear which is the object to be controlled and the generated quality control information.

Figure 6:
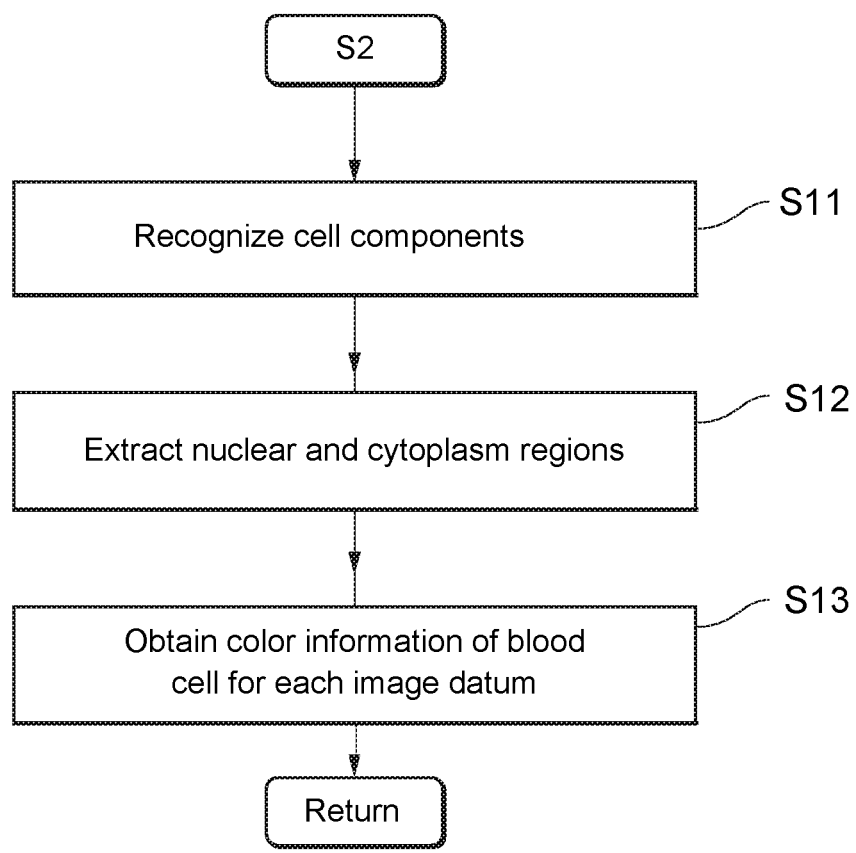
FIG. 6 is a flowchart illustrating a feature value obtaining process.

FIG. 6 is a flowchart illustrating a feature value obtaining process in step S2 in FIG. 5. As illustrated in FIG. 6, the controller 50 illustrated in FIG. 4 recognizes each cell component based on the obtained plurality of image data (step S11). Next, the controller 50 identifies and extracts regions of each cell including nucleus/cytoplasm based on the recognition result in step S11 (step S12). The controller 50 obtains, for each of the plurality of image data, color information (the feature value reflecting the staining state of the smear) of blood cells in the extracted regions (step S13).

Figure 7:
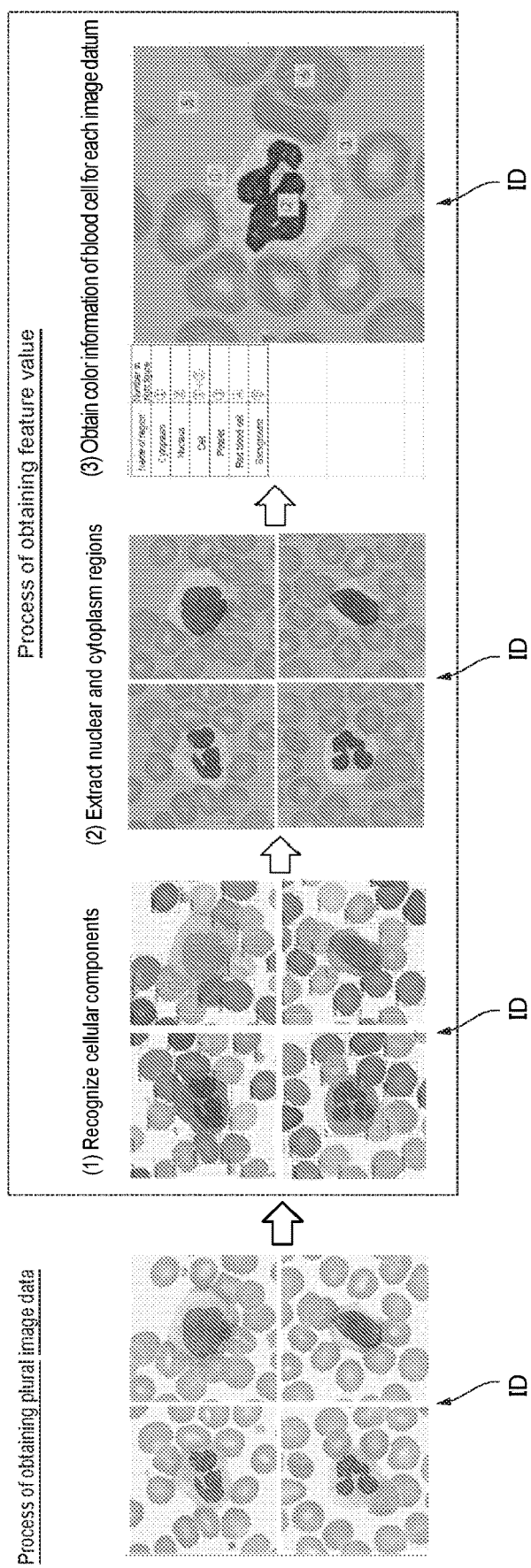
FIG. 7 is a diagram illustrating details of an image data obtaining process and a feature value obtaining process in the process of generating the quality control information.

FIG. 7 is a diagram illustrating details of a process of obtaining image data and a process of obtaining a feature value in a process of generating quality control information. As illustrated in FIG. 7, the controller 50 obtains, from each of a plurality of smears, a plurality of image data IDs, for example, several hundred or several thousand image data IDs. More specifically, the controller 50 obtains the plurality of image data IDs obtained by the smear image capturing apparatus 40 of the testing system 70-1 illustrated in FIG. 1.

The controller 50 illustrated in FIG. 4 obtains, from each of the plurality of image data IDs, a feature value that reflects a staining state of a smear. As illustrated in FIG. 7, the controller 50 performs, as the process of obtaining the feature value, (1) recognition of cell components, (2) extraction of nuclear/cytoplasmic regions, and (3) acquisition of color information of blood cells for each image datum, corresponding to the flowchart illustrating the process of obtaining the feature value illustrated in FIG. 6.

More specifically, as the process (1), the controller 50 recognizes each cell component based on the obtained plurality of image data IDs. Next, as the process (2), the controller 50 identifies and extracts regions of each cell including, for example, the nucleus/cell cytoplasm based on the recognition result of the process (1). As the process (3), for each of the plural image data IDs, the controller 50 obtains the color information of the blood cells (the feature value that reflects the staining state of the smear) with mapping information on a cell type (a red blood cell, white blood cell, platelet, etc.) and a structural component (a nucleus, cell cytoplasm, granule, etc.) in each extracted region.

The feature value that reflects the staining state of the smear includes the color information obtained from each region of the blood cell in the image data, as described above. The "feature value reflecting the staining state of the smear" includes, for example, at least one of the values of luminance, hue (Hue), saturation (Saturation), and lightness (Value) of a color component (e.g., Red, Green, Blue) obtained from the image data of the blood cell, and their combined values (e.g., HSV value, RGB).

The "blood cell" includes, for example, at least one of a red blood cell, white blood cell, and platelet. The white blood cell includes, for example, at least one of basophil, eosinophil, neutrophil, monocyte, and lymphocyte.

The red blood cells, which account for about 90% of the blood cells in the blood, also account for a large proportion (area) of the smear. Therefore, the color information of the red blood cells is more preferable as the feature value reflecting the staining state of the smear, because the color information of the red blood cells can be information reflecting the staining state of the entire smear. The color information of the red blood cells tends to reflect a change in the staining state due to a difference in the staining condition, such as pH, etc., more easily than the color information of the white blood cells.

On the other hand, as the feature value reflecting the staining state of the smear, the color information of the white blood cells may be adopted. In this case, multiple types of feature values that reflect the staining state of the smear, such as red blood cells, white blood cells, etc. of the smear, may be used for the quality control. For example, the quality of the staining state of the entire smear may be managed by using at least one of the color information of the red blood cells and at least one of the color information of the white blood cells, while the stainability of components (e.g., nuclei or granules) of the white blood cells, which are important objects of analysis, can be managed.

In the following, examples of output screens outputting quality control information and feature values reflecting staining states of smears to be controlled are described with reference to FIG. 8 to FIG. 11.

Figure 8:
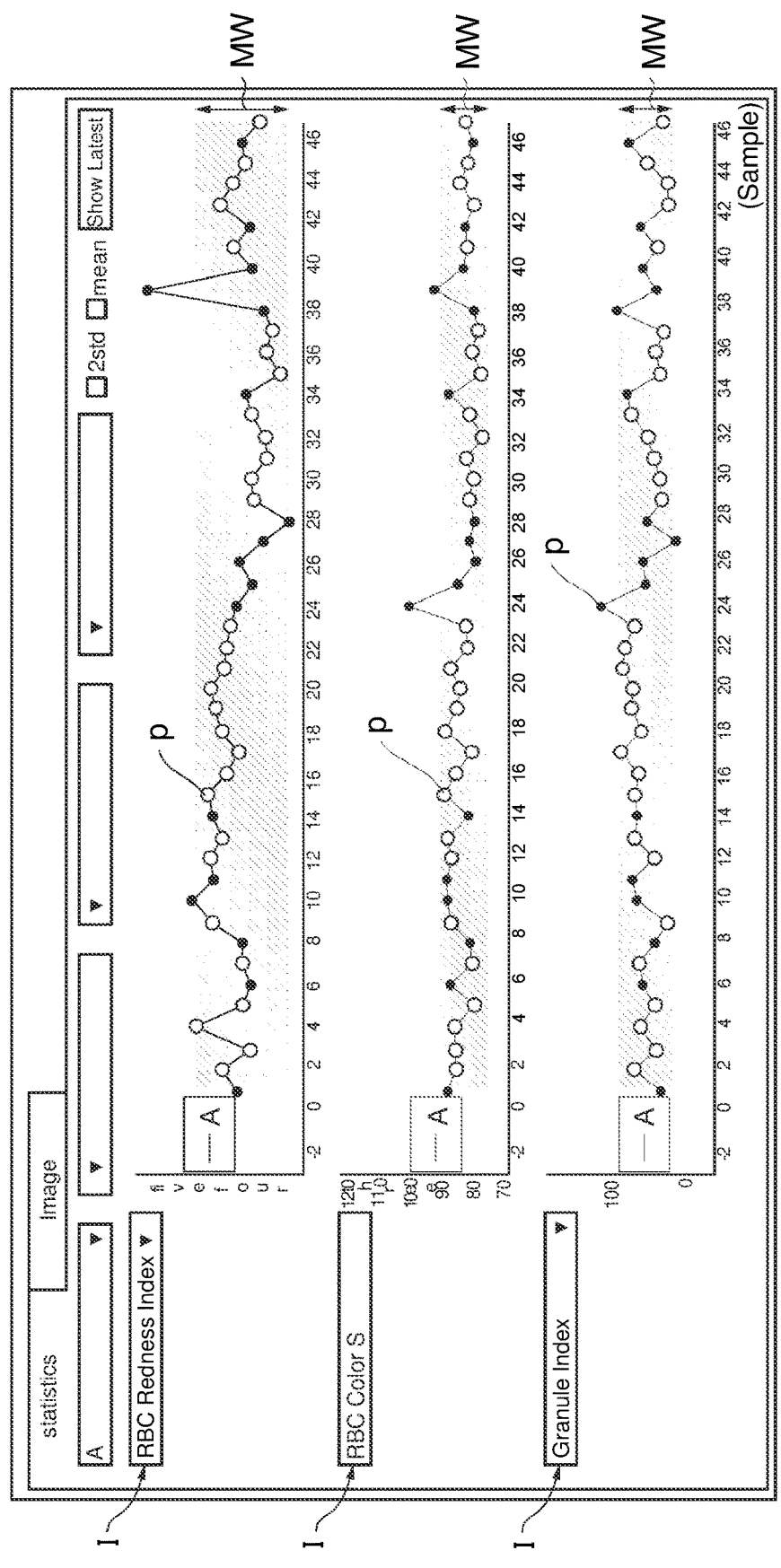
FIG. 8 is a diagram illustrating an output screen outputting quality control information and feature values that reflect staining states of smears to be controlled.

FIG. 8 illustrates an example of an output screen, as an output screen for internal quality control, outputting quality control information and feature values that reflect staining states of smears to be controlled. The internal quality control compares a quality control information (for example, control width MW) obtained based on the feature values of the plural smears in a single testing facility with a feature value(s) that reflects a staining state(s) of a smear(s) to be controlled among the plural smears produced.

For example, when a specific feature value that reflects the staining state of a smear to be controlled deviates from the control width MW, it can be understood that there is a problem in the staining state of the smear to be controlled. Therefore, in the internal quality control described above, the quality of the smear to be controlled can be assured.

The generating apparatus 80 illustrated in FIG. 1 obtains, from each of plural smears produced at a single testing facility, a plurality of feature values of each smear and outputs quality control information determined based on the plurality of feature values. As illustrated in FIG. 8, for each index I (e.g., RBC Redness Index, RBC Color S, Granule Index), the generating apparatus 80 outputs plots P of the feature values of the smears related to the color information of the red blood cells and plots P of the feature values of the smears related to the color information of the white blood cells, together with the control width MW. According to the configuration, it is possible to understand the staining state of the entire smear based on the color information of the red blood cells while accurately controlling the stainability and the form of the white blood cells, which are important targets for analysis. Also, instead of the control width MW, at least one of the upper limit value and the lower limit value may be output as a solid line or a dotted line.

The RBC Redness Index, which is an index I of the feature value, is a value calculated from mean values of hue values of the red blood cells, saturation values of the red blood cells, and lightness values of the red blood cells by conducting principal component analysis, respectively. The RBC Color S, which is an index I of the feature value, is a saturation value of the red blood cells. Granule Index, which is an index I of the feature value, is a granule index of the white blood cells. Also, the generating apparatus 80 may output only the plots P of the feature values relating to the color information of the red blood cells to the output screen, or may output only plots P of the feature values relating to the color information of the white blood cells to the output screen.

The quality control information for the internal quality control is information that indicates variation in the stainability (the staining states) of the smears in a single testing facility. The quality control information can serve as a standard of the quality control according to the staining condition in the single testing facility. Therefore, the quality of the smears produced daily in the single testing facility can be controlled based on the standard appropriate for that single testing facility.

In addition, the quality control information for the internal quality control can be used in the following situations. For example, the quality control information for the internal quality control is used to confirm whether there is any problem with the staining states of the smears obtained after maintenance of the testing apparatus or the reagent exchange. Also, according to the quality control information for the internal quality control, by checking the trend of rise or fall of the feature values over time, an abnormality of the reagent or the testing apparatus can be identified in advance. Furthermore, because an environmental condition, such as temperature, humidity, or the like, affects the stainability of the smears, the quality control information for the internal quality control can also be used to optimize the staining condition in response to a change in the environmental condition.

Next, an example of an output screen, as an output screen for an external quality control, outputting quality control information and feature values that reflect staining states of smears to be controlled is described. The external quality control compares a control width for feature values set for each of plural testing facilities located in a same or different regions or the like with a feature value(s) that reflects a staining state(s) of a smear(s) to be controlled among a plurality of smears that are produced. For example, when a specific feature value that reflects the staining states of the smears to be controlled in a specific testing facility is outside the control widths of other testing facilities in the same or different regions or the like, the external quality control can objectively determine the position of the specific testing facility in the plural testing facilities.

Figure 9:
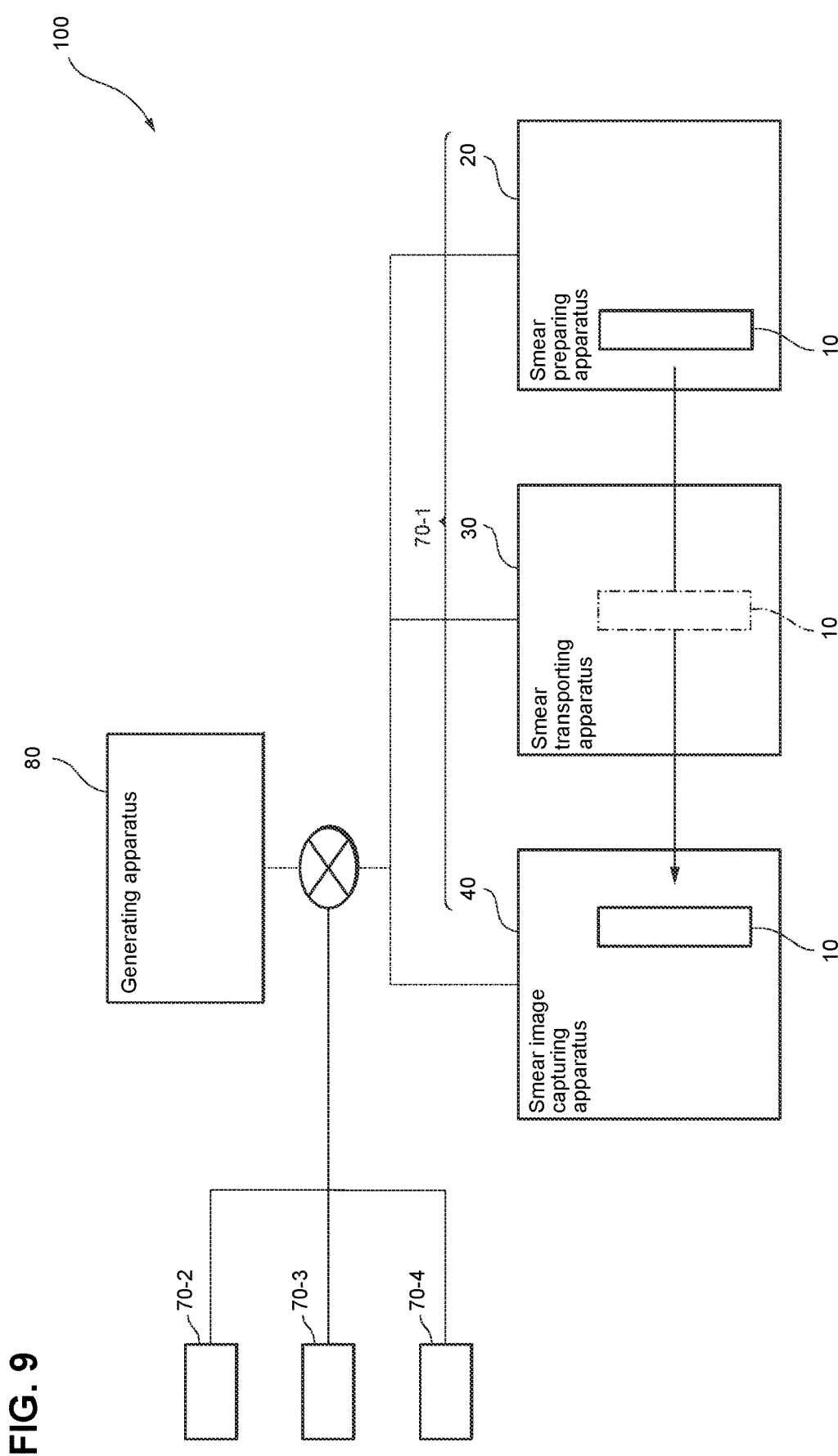
FIG. 9 is a schematic diagram illustrating an overview of a generating system.

As illustrated in FIG. 9, testing systems 70-1 to 70-4 are provided in testing facilities (testing facilities A-D) respectively. a generating apparatus 80 is connected via a network to a smear preparing apparatus 20, a smear transporting apparatus 30, and a smear image capturing apparatus 40 of each of the plural testing systems 70-1 to 70-4. The generating apparatus 80 is installed at a facility of a provider (e.g., a manufacturer of the smear image capturing apparatus 40), and obtains, from each of the testing systems 70-1 to 70-4 of the plural testing facilities (testing facilities A-D), captured image data of smear slides 10, obtains feature values reflecting staining states of the smears from the image data, and generates quality control information based on the obtained feature values.

Figure 10:
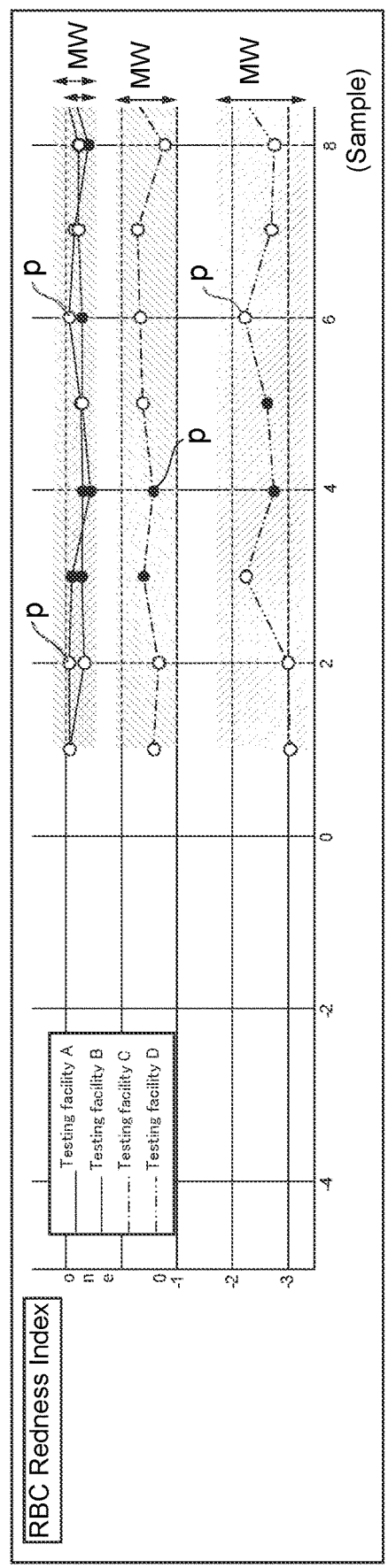
FIG. 10 is a diagram illustrating an output screen outputting quality control information and feature values that reflect staining states of smears to be controlled.

As illustrated in an output screen illustrated in FIG. 10, plots P of plural feature values may include, for example, a plot(s) P of a feature value(s) obtained from at least one smear obtained at a testing facility A (a first facility) and a plot(s) P of a feature value(s) obtained from at least one smear obtained at testing facilities B, C, or D (a second, third, or fourth facilities), for example. The quality control information displayed on the output screen may indicate a quality control standard adapted to the staining condition of each of the plural testing facilities A-D (the first to fourth facilities). Therefore, it is possible to easily grasp differences in the staining states of the smears among the plural testing facilities A-D (the first to fourth facilities). In addition, when a laboratory technician belonging to one testing facility is asked to review and analyze an image(s) of a smear(s) obtained in another testing facility, the staining state(s) of the smear(s) in said another testing facility often differs from that in his/her own testing facility, which makes the analysis of the image(s) of the smear(s) difficult. In this regard, the above-mentioned quality control information, which can easily grasp the differences between the staining states of the smears among the plural testing facilities, can serve as supplementary information for the image analysis and review among the plural testing facilities.

Note that although the example of the output screen of FIG. 10 is to understand the differences in the staining states of the smears among the plural different testing facilities, quality control information obtained based on the feature values of the smears being identifiable for each of plural different smearing/staining conditions may be output on the output screen.

Figure 11:
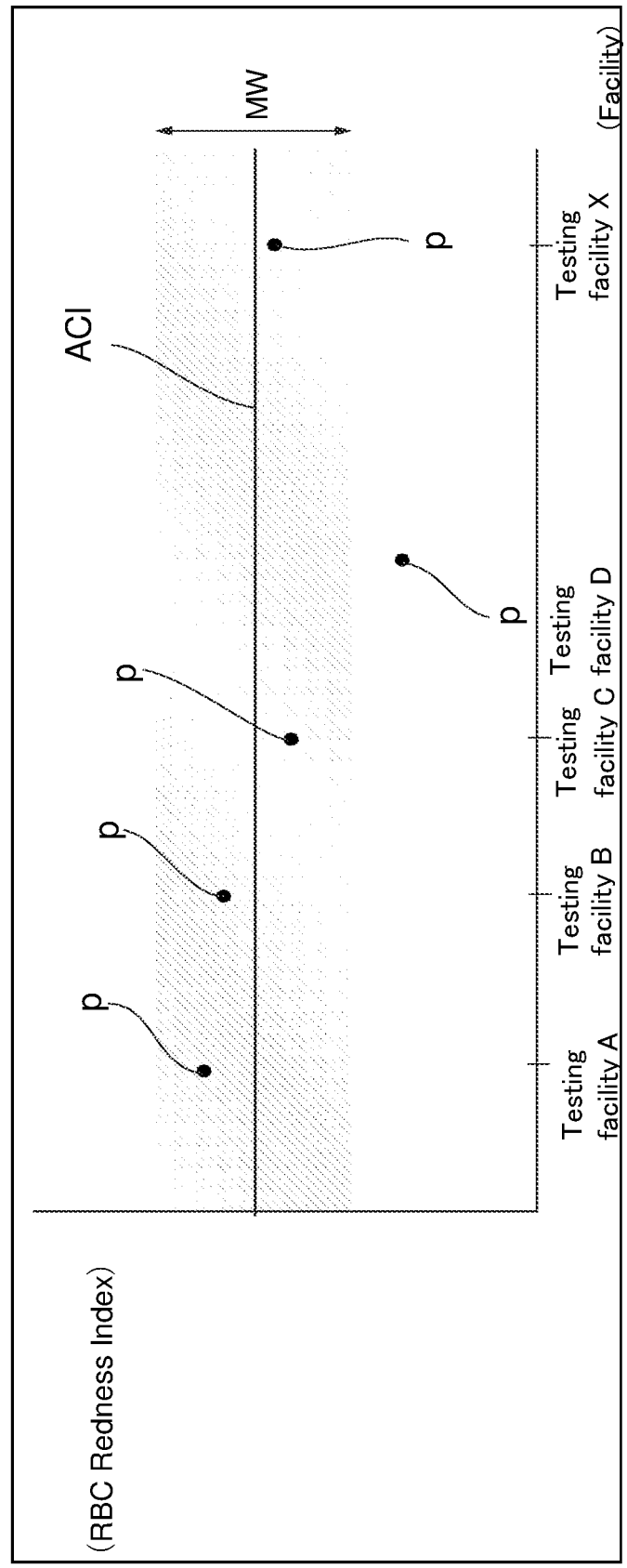
FIG. 11 is a diagram illustrating an output screen outputting quality control information and feature values that reflect staining states of smears to be controlled.

As illustrated in an output screen illustrated in FIG. 11, plots P of feature values on the output screen includes a plot P of a feature value that is obtained from a plurality of smears at a testing facility A and a plot P of a feature value that is obtained from a plurality of smears at a testing facility B, C, D, . . . , or X. As illustrated in the output screen, at least one of a control width MW and a target ACI (quality control information) may include quality control information of the testing facility A that is generated based on the feature value P of the testing facility A and quality control information of the testing facility B, C, D, . . . , or X that is generated based on the feature value P of the testing facilities B, C, D, . . . , or X.

The quality control information that is output on the output screen illustrated in FIG. 11 can be information indicates variations in the staining states of the smears between the plural testing facilities or a standard for the quality control regarding the staining states of the smears for the plural testing facilities as a whole. Thus, it is possible to easily grasp differences in the staining states of the smears between the plural testing facilities. Also, it is possible to use the information of the feature value of the smears and the quality control information of your own testing facility for analyzing the staining condition in your own testing facility.

FIG. 12 is a diagram illustrating an example of feature values that reflect a stainability of red blood cells. As illustrated in FIG. 12, the feature values that reflect the stainability of the red blood cells include, for example, a mean value of luminance values of the red blood cells for each color component, a mean value of hue values of the red blood cells, a mean value of saturation values of the red blood cells, a mean value of lightness values of the red blood cells, and an HSV value of the red blood cells. Here, an example of a process of obtaining the mean value of the luminance values of the red component of the red blood cells, as an example of the feature value, is described with reference to FIG. 13.

Figure 13:
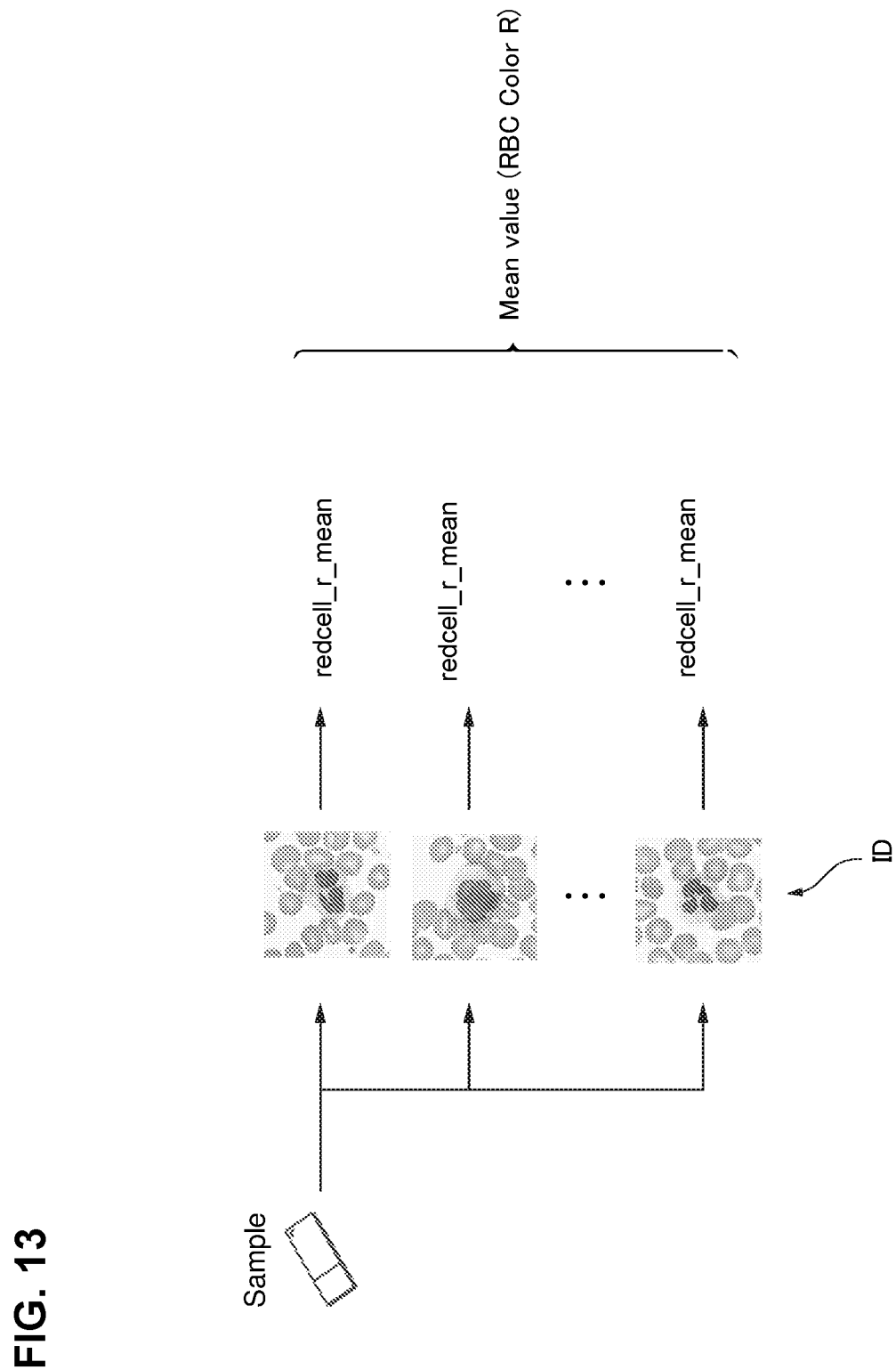
FIG. 13 is a diagram illustrating a process of obtaining a feature value related to red blood cells.

As illustrated in FIG. 13, the controller 50 illustrated in FIG. 4 obtains a plurality of image data IDs that are generated by imaging a single smear (sample). Next, the controller 50 illustrated in FIG. 4 obtains a mean value (redcell_r_mean) of red (R) component in red blood cell regions for each of the plurality of the obtained image data IDs. Then, the controller 50 obtains, based on all the plurality of image data IDs (number of images) of the single smear, a mean value (RBC Color R) of the mean values (redcell_r_mean) of the red (R) component of the red blood cell regions for the plurality of the obtained image data IDs.

Feature values obtained from the white blood cells in the image data includes feature values corresponding to color information that are obtained from structural components, such as nucleus, cytoplasm, granule, and the like of the white blood cells. These feature values reflect the stainability of the structural components of the white blood cells. A specific example of the feature values obtained from the white blood cells is described with reference to FIG. 14.

FIG. 14 is a diagram illustrating an example of the feature values that reflect the stainability of the white blood cells. As illustrated in FIG. 14, the feature values that reflect the stainability of the white blood cells include, for example, a mean value of luminance values of cytoplasmic regions of the white blood cells for each color component, a mean value of hue values of the cytoplasmic regions of the white blood cells, a mean value of saturation values of the cytoplasmic regions of the white blood cells, and a mean value of brightness values of the cytoplasmic regions of the white blood cells. The feature values that reflect the stainability of the white blood cells include, for example, a mean value of luminance values of nuclear regions of the white blood cells for each color component, a mean value of hue values of the nuclear regions of the white blood cells, a mean value of saturation values of the nuclear regions of the white blood cells, and a mean value of brightness values of the nuclear regions of the white blood cells. Also, the feature values that reflect the stainability of the white blood cells may include values of standard deviations regarding the luminance values, the hue values, the saturation values, and the brightness values of the cytoplasmic regions and the nuclear regions of the white blood cells. The feature values that reflect the stainability of the white blood cells include, for example, a mean value of granule indexes of the white blood cells. Note that the feature values include feature values that reflect a blood cell form.

The feature values obtained from the blood cells in the image data of the smear include, in addition to the feature values that reflect the staining state of the smear described above, the feature values that reflect the information of the blood cell form.

FIG. 15 is a diagram illustrating an example of feature values that reflect a blood cell form. As illustrated in FIG. 15, feature values that reflect a blood cell form obtained from blood cells includes, for example, a mean value of cell diameters of the blood cells, a mean value of nuclear diameters of the blood cells, a mean value of N/C ratios of the blood cells, a mean value of areas of cytoplasm of the blood cells, a mean value of circularities (roundness ratios) of the blood cells, and a mean value of circularities of nuclei of the blood cells.

Figure 16:
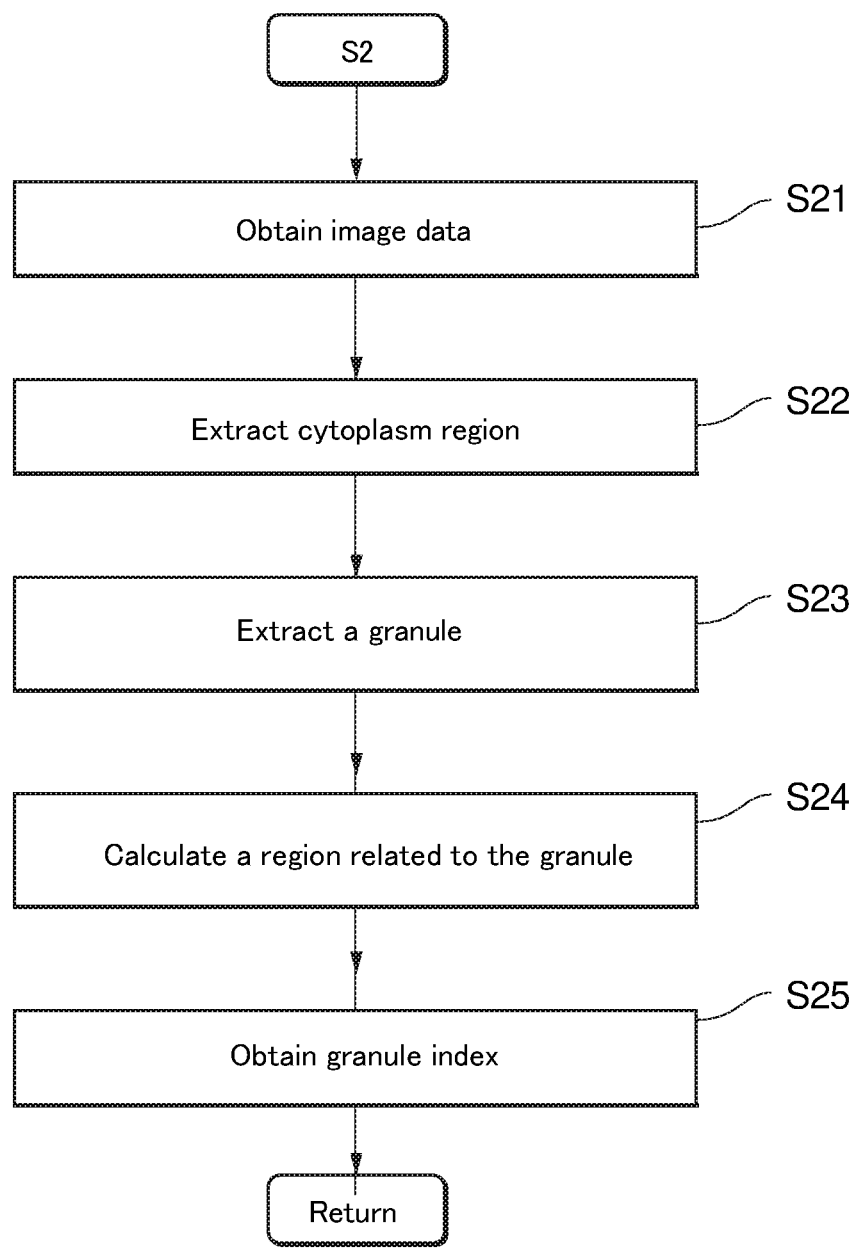
FIG. 16 is a flowchart illustrating a process of obtaining a granule index.
Figure 17:
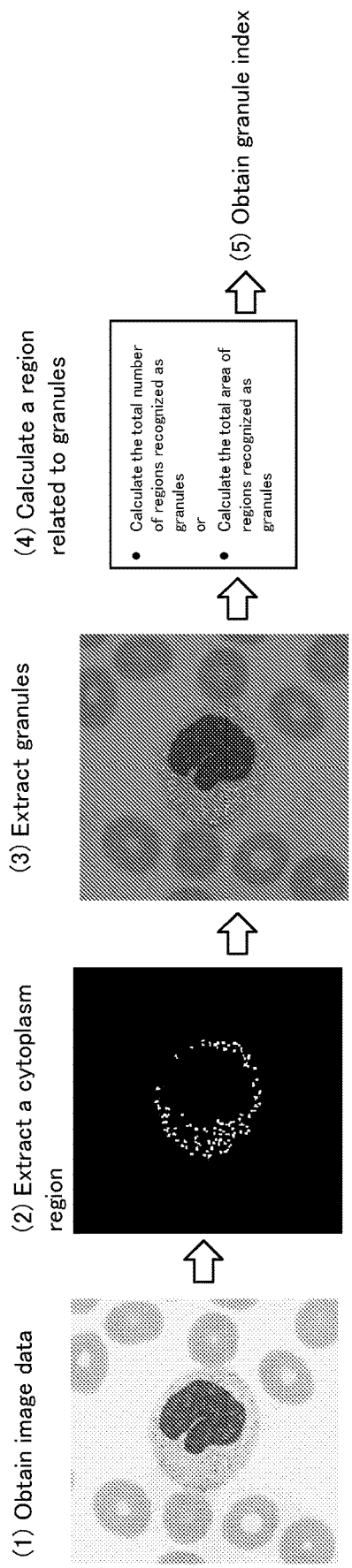
FIG. 17 is a diagram illustrating a process of obtaining the granule index.

Here, with reference to FIG. 16 and FIG. 17, an example of a process of obtaining a granule index (Granule_Index), as an example of a feature value, of neutrophils among white blood cells is described.

FIG. 16 is a flowchart illustrating an example of a process of obtaining a granule index, which corresponds to the process of obtaining the feature value in step S2 in FIG. 5. As illustrated in FIG. 16, the controller 50 illustrated in FIG. 4 obtains image data that include, for example, white blood cells, in a smear (step S21). The controller 50 performs, for example, a local binarization process on the obtained image data to extract cytoplasmic regions (step S22). The controller 50 extracts granules (step S23). Specifically, the controller 50 identifies granules (e.g., granules each of which includes a few pixels or more) based on a predetermined number of pixels from the extracted cytoplasmic regions. The controller 50 obtains a granule size (area) and an average luminance for each identified granule. The controller 50 classifies the identified granules into primary granules and secondary granules by defining a predetermined threshold value for each of the granule size and the difference between the granule average luminance and the cytoplasm average luminance.

Next, the controller 50 calculates regions related to the granules (step S24). Specifically, the controller 50 calculates the total number of the primary granules and the secondary granules in the granule regions recognized as granules. The controller 50 may calculate the total area of the regions recognized as granules (total granule area) or the total granule area ratio of the regions recognized as granules. The controller 50 obtains at least one of the calculated total number of the granules, the calculated total granule area, and the calculated total granule area ratio as a granule index (step S25).

Here, referring to FIG. 17, an example of a process of obtaining, for example, a granule index (Granule_Index) relating to neutrophils among white blood cells as an example of a feature value is described. As illustrated in FIG. 17, (1) the controller 50 illustrated in FIG. 4 obtains image data that include white blood cells in a smear. (2) The controller 50 extracts cytoplasmic regions by performing, for example, a local binarization process on the obtained image data. Here, the "granule index" is a feature value reflecting a number of granules included in the white blood cell, and can be obtained based on a number or area of granule regions identified in the cytoplasmic region of the white blood cell. The "granule region" can be identified based on the binarized image data distinguishing from the cytoplasmic region.

(3) The controller 50 identifies the granules (e.g., granules each of which includes a few pixels or more) based on a predetermined number of pixels from the extracted cytoplasmic region. The controller 50 obtains a granule size (area) and an average luminance for each identified granule. The controller 50 classifies the identified granules into the primary granules and the secondary granules by establishing a predetermined threshold value for each of the granule size and the difference between the granule average luminance and the cytoplasm average luminance (e.g., a difference between an average luminance of a portion of the cytoplasm except for the granule portions and the average luminance of the granule portions). Here, when the difference between the granule average luminance and the cytoplasm average luminance is 0 (zero), it indicates that the luminance is the same as that of the background portion of the image data. Also, when the difference between the granule average luminance and the cytoplasm average luminance is large in a negative direction, it indicates that the granule portions is thicker (darker) than the other portions. A process of classifying granules is described in more detail in FIG. 18.

Figure 18:
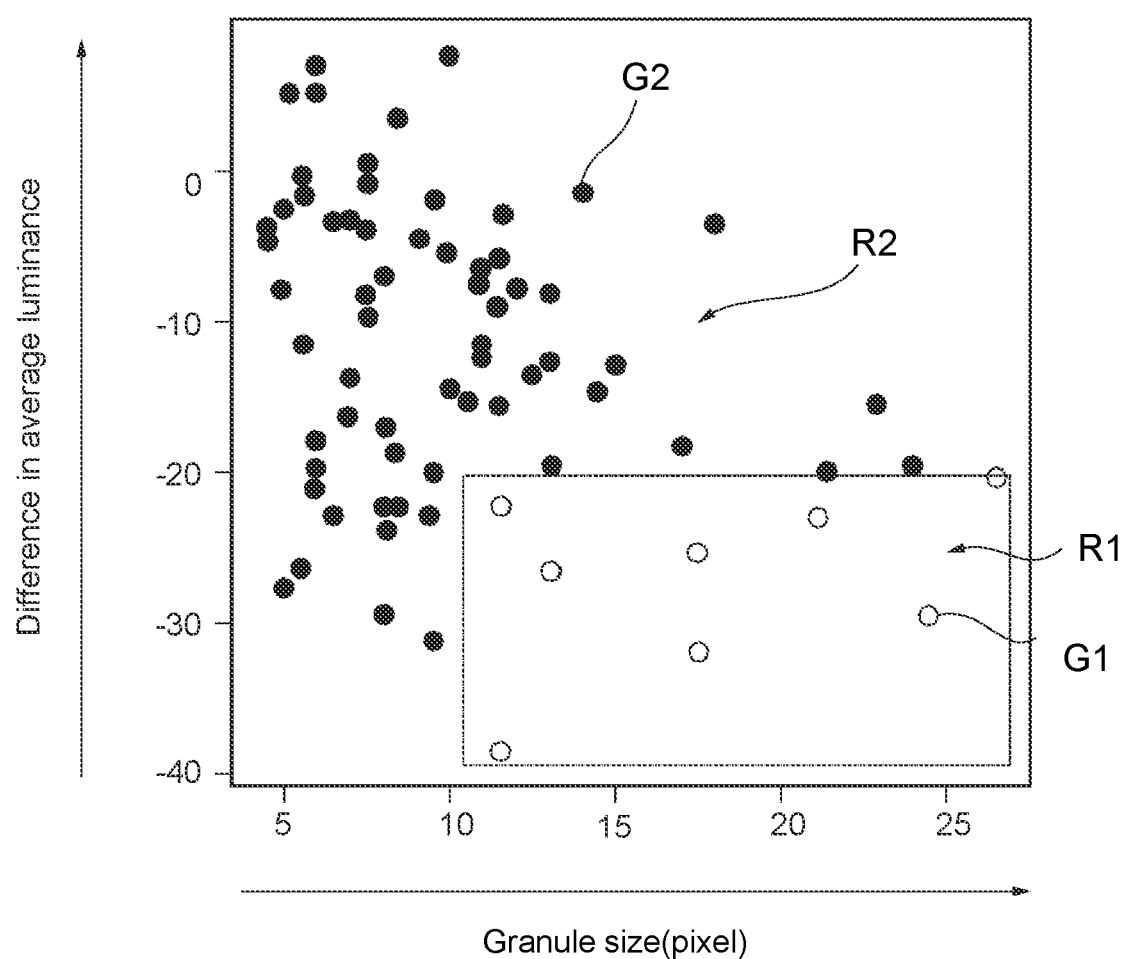
FIG. 18 is a diagram illustrating a process of extracting primary granules and secondary granules.

FIG. 18 is a diagram illustrating an example of a process of extracting primary granules and secondary granules. For example, when the threshold value for the granule size of the secondary granules is set to "10" pixels and the threshold value for the difference between the granule average luminance and the cytoplasm average luminance is set to "0", the controller 50 classifies the identified granules into the primary granules G1 included in a region R1 surrounded by a dashed line in the graph in FIG. 18 and the secondary granules G2 included in a region R2 different from the region R1 in the graph in FIG. 18. Each of the above threshold values can be arbitrarily set based on the resolution of the image data, for example, and can be changed as appropriate. Also, the size of one pixel may be set as desired, for example, approximately 0.01 µm².

Returning to FIG. 17, (4) the controller 50 calculates the total number of the primary granules and the secondary granules in the granule regions recognized as granules. The controller 50 may calculate the total area of the regions recognized as granules (total granule area) or the total granule area ratio of the regions recognized as granules. Here, since there is a certain correlation between the total number of the granules in the granule regions and the total granule area and the total granule area ratio, the total granule area or the total granule area ratio can be adopted as a feature value in addition to or instead of the total number of the granules in the granule regions. The total granule area ratio is, for example, a ratio of how much of a cytoplasmic area is occupied by the granule area. (5) The controller 50 obtains at least one of the calculated total number of the granules in the granule regions, the calculated total granule area, and the calculated total granule area ratio as the granule index. By obtaining the granule index, a change in the granules of the blood cells can be indicated objectively and quantitatively, which can use for diagnosis and evaluation of a disease with an increase or decrease in the granules, such as an infectious disease with an increase in the granules, myelodysplastic syndromes (MDS: myelodysplastic syndromes) with a decrease in the granules, or the like.

Figure 19:
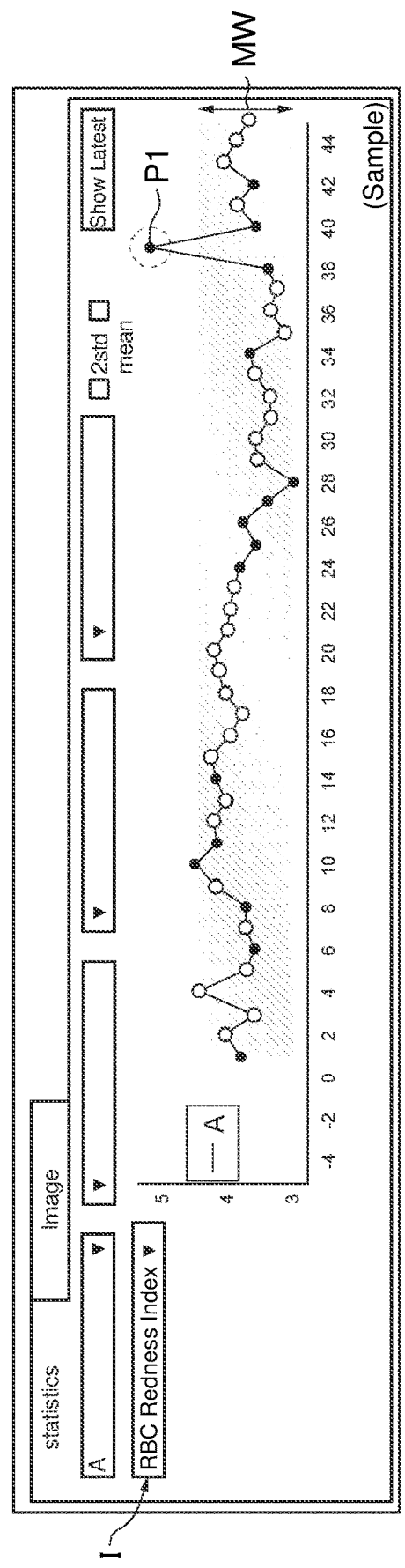
FIG. 19 is a diagram illustrating an output screen outputting quality control information and feature values reflecting staining states of smears to be controlled.

FIG. 19 is a diagram illustrating an example of an output screen of quality control information and feature values reflecting staining states of smears to be controlled. The quality control information and the feature values reflecting the staining states of the smears to be controlled are output in such a way that it is possible to identify whether any one of the feature values reflecting the staining states of the smears to be controlled is within a predetermined range. In the example of the screen illustrated in FIG. 19, since a plot P1 having a specific feature value is, for example, out of the control width MW, the plot P1 having the specific feature value is output in a form different from other plots on the output screen. For example, the plot P1 is output with more emphasis than other plots. More specifically, the plot P1 is output in a different color, a different size, or a different shape from the other plots (e.g., the plot P1 is in a round shape and other plots are in square shapes). According to the configuration, it is possible to easily distinguish a plot(s) having a feature value that is out of a predetermined range from other plots that are within the predetermined range.

Figure 20:
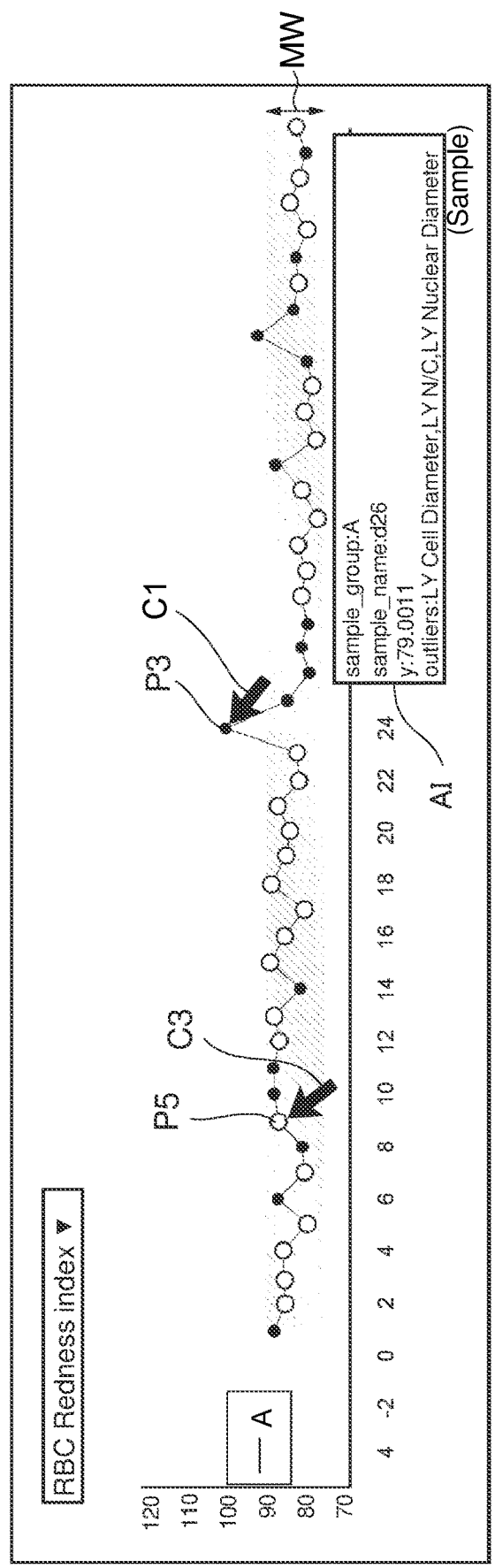
FIG. 20 is a diagram illustrating an output screen outputting quality control information and feature values reflecting staining states of smears to be controlled.

FIG. 20 illustrates an example of an output screen including a predetermined alert indication for a plot having a specific feature value that is out of the control width MW. As illustrated in FIG. 20, when a first specific operation is performed by the user on a plot P3 having a specific feature value that is out of the control width MW, an alert indication AI including detailed information on the specific feature value of the plot P3 is output. The first specific operation by the user is arbitrary, but for example, includes an operation of stopping a cursor C1, which corresponds to a mouse movement operated by the user, on the plot P3 for a certain period of time. According to the configuration, the detailed information on the specific feature value that is out of the control width can be appropriately presented to the user. Therefore, the user can easily identify a cause of the feature value deviating from the control width by seeing the detailed information. When a one-click operation is performed with a mouse when the cursor C1 is stopped on the plot P3, a screen that displays a plurality of image data associated with the feature value of the plot P3 may be displayed, such as being illustrated in FIG. 21, which is described below.

Figure 21:
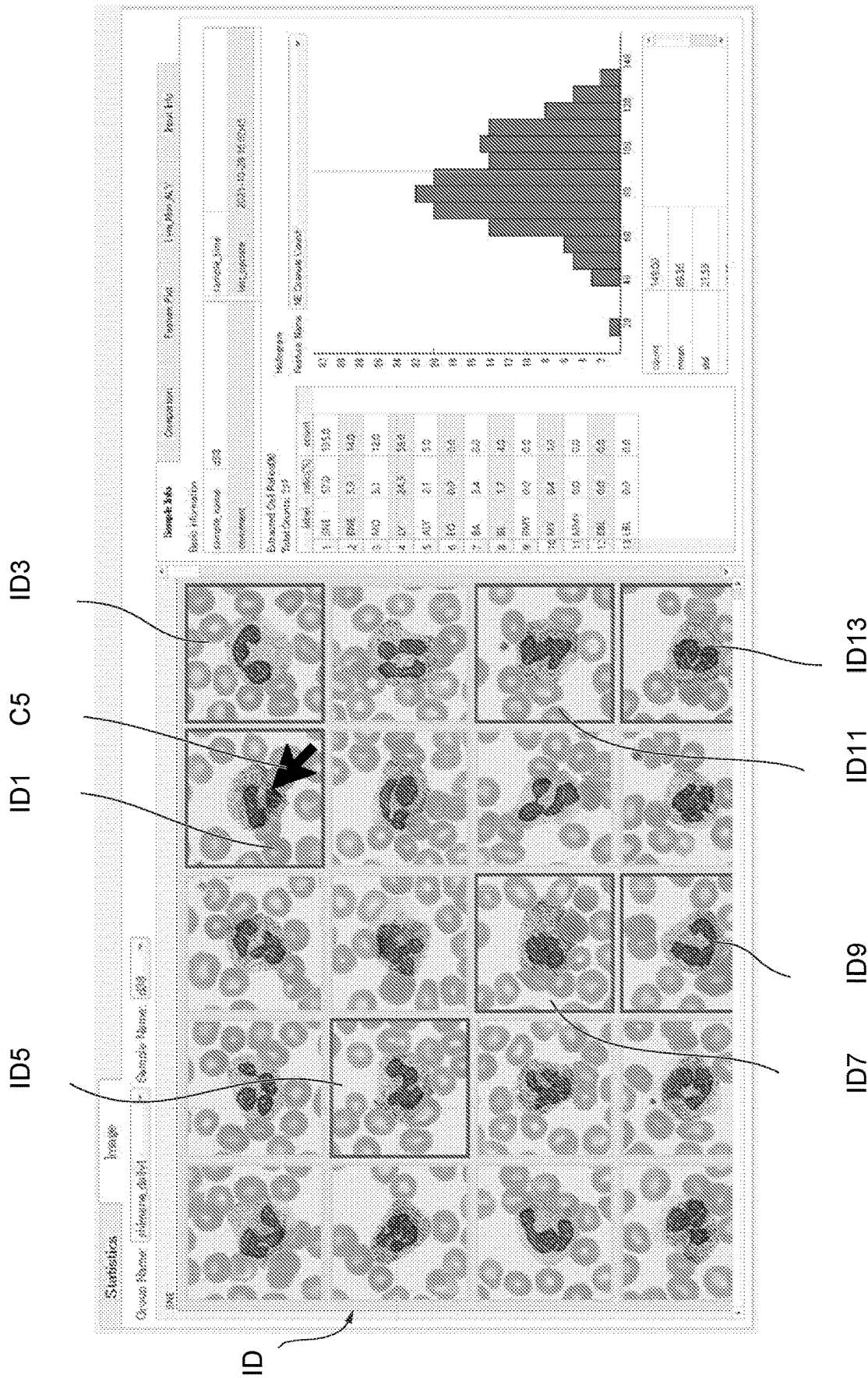
FIG. 21 is a diagram illustrating a screen displaying a plurality of image data obtained from a smear.

FIG. 21 is a diagram illustrating an example of a screen displaying a plurality of image data obtained from a single smear. In particular, FIG. 21 illustrates a screen that is output, for example, when the user performs a predetermined operation on the screen illustrated in FIG. 20. For example, when a second specific operation is performed by the user on a plot P5 having a specific feature value on the output screen illustrated in FIG. 20, the screen illustrated in FIG. 21 is output, displaying plural image data IDs that are used in obtaining the specific feature value of the plot P5. According to the configuration, the user can easily check a list of the plural image data IDs that are used in obtaining the specific feature value as desired by the user.

The second specific operation by the user is arbitrary, and, for example, includes a double-click operation with the mouse when the cursor C3 is stopped on the plot P5. Also, it is preferable that the first specific operation and the second specific operation are different operations, but they may be the same operation.

Figure 22:
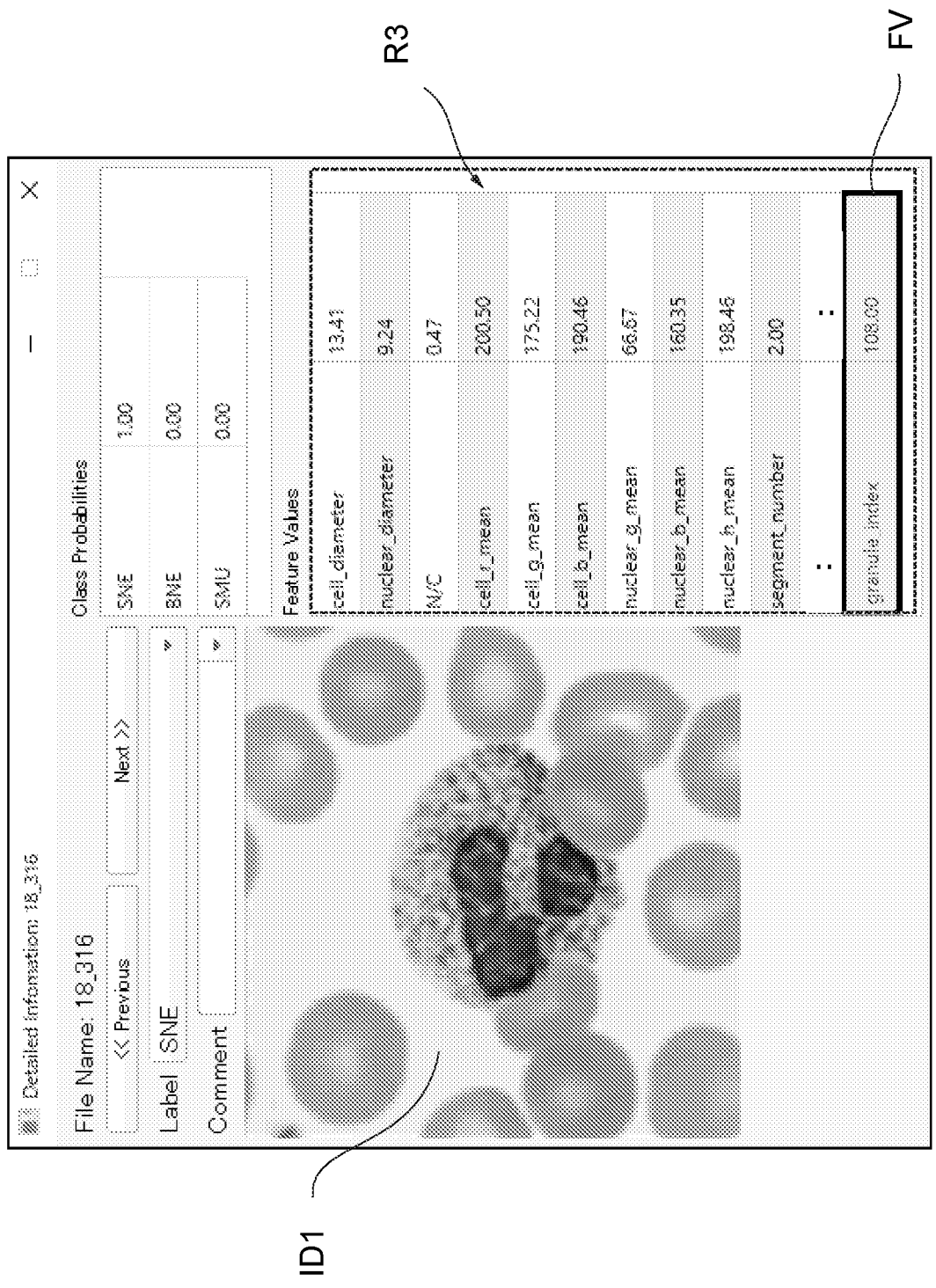
FIG. 22 is a diagram illustrating a screen displaying specific image data and a plurality of feature values associated with the specific image data.

FIG. 22 is a diagram illustrating an example of a screen displaying specific image data and a plurality of feature values (Feature Values) associated with the specific image data. In particular, FIG. 22 is a screen that is output, for example, when the user performs a predetermined operation on the screen illustrated in FIG. 21. For example, when a third specific operation by the user is performed for a specific image data ID1 on the output screen illustrated in FIG. 21, the screen including a region R3 surrounded by a dashed line that displays detailed information on the plurality of feature values corresponding to the selected specific image data ID1 is output. According to the configuration, the user can easily check a list of the plurality of feature values corresponding to the specific image data desired by the user. Note that the third specific operation by the user is arbitrary, and, for example, includes a double-click operation with the mouse when a cursor C5 illustrated in FIG. 21 is stopped on the image data ID1.

Here, a feature value FV (e.g., granule_Index) that is out of a preset normal range (control width) may be displayed in a different form from other feature values. According to the configuration, the specific feature value FV that is an abnormal value can be easily distinguished from other (normal) feature values.

Figure 23:
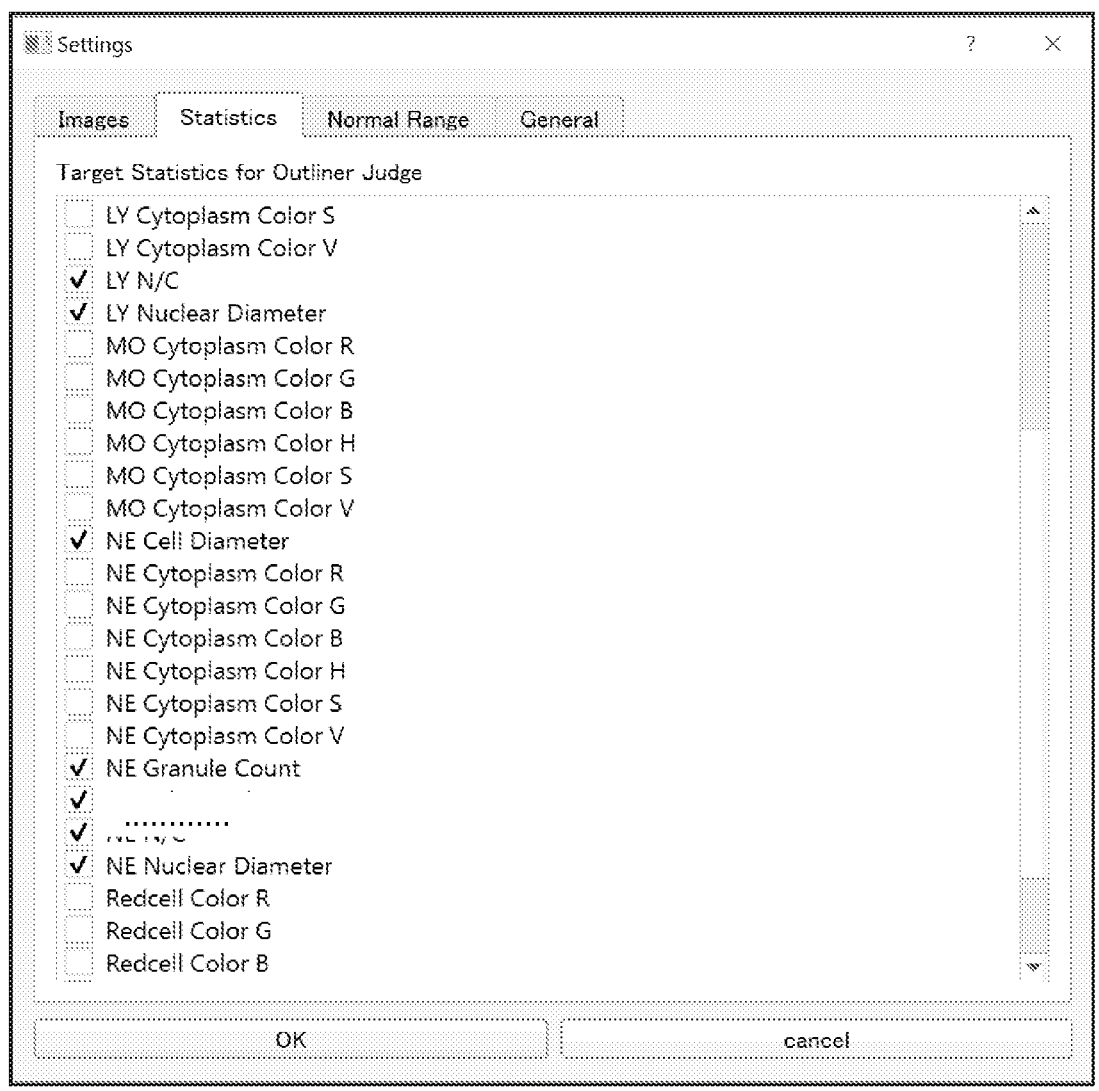
FIG. 23 is a diagram illustrating a screen on which a feature value(s) to be obtained can be selected.

FIG. 23 is a diagram illustrating an example of a screen on which a feature value(s) to be obtained can be selected. The feature value(s) that are to be obtained or the feature value(s) that are to be output on the screen(s) are predetermined for each testing facility or each region or the like, for example. On the other hand, the user can select one or more feature values desired by the user by operating the feature value selection screen such as being illustrated in FIG. 23. According to the configuration, a feature value(s) desired by the user can be output on the output screen for the feature value(s) reflecting the staining state of the smear to be controlled and the quality control information.

Figure 24:
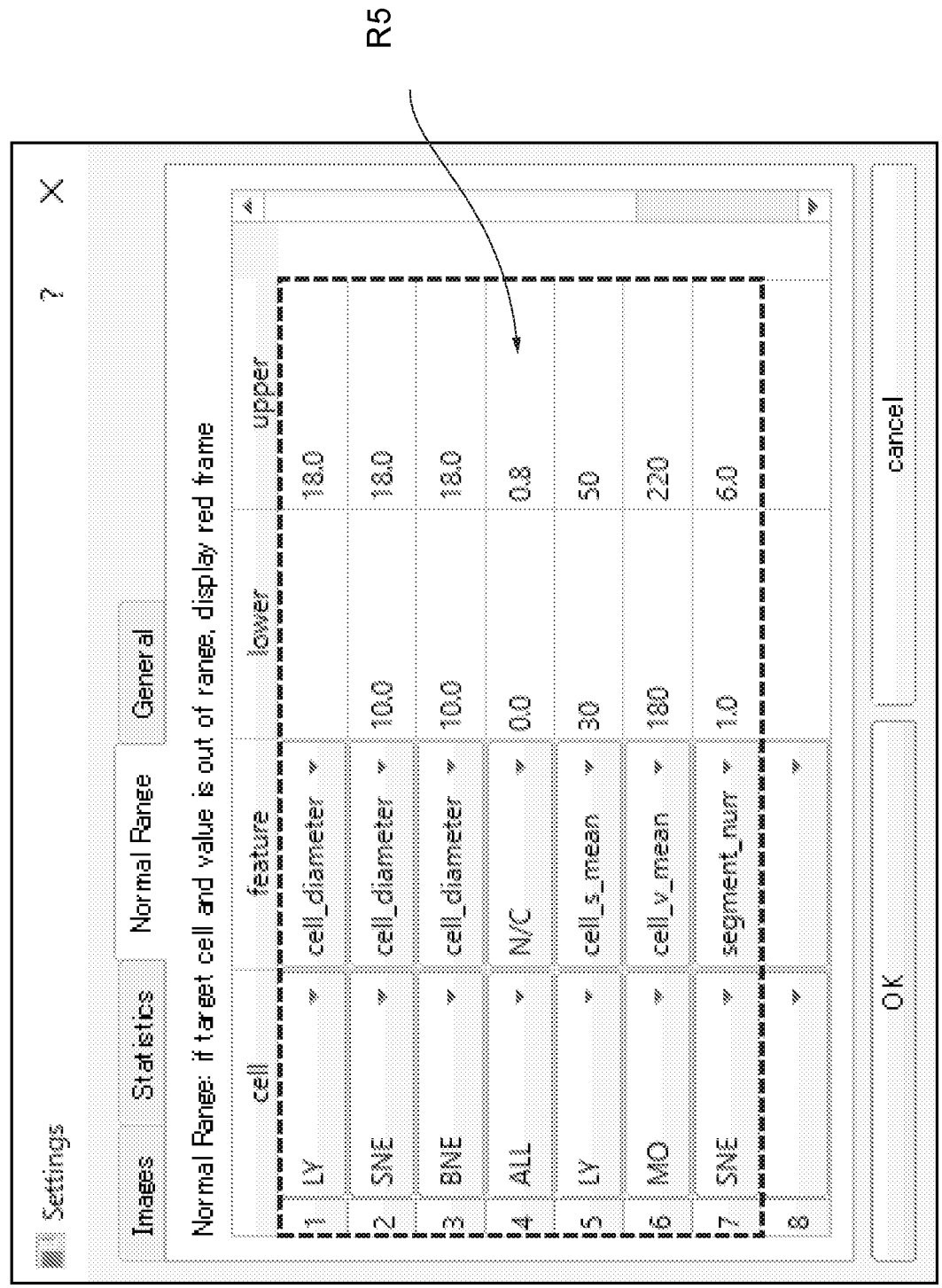
FIG. 24 is a diagram illustrating a screen through which a normal range can be set for each of feature values.

FIG. 24 is a diagram illustrating an example of a screen where a normal range (control width) can be set for any feature value. In the screen illustrated in FIG. 24, the user can set, for example, based on a result of quality control conducted at each testing facility, a control width for any feature value in a region R5 surrounded by a dashed line. For example, either of values in the fifth row ("cell" column is "5 LY" and "feature" column is "cell_s_mean" or values in the six row ("cell" column is "6 MO" and "feature" column is "cell_v_mean") indicate a control width for a feature value related to a staining state of cytoplasm. In addition, values in the seventh row ("cell" column is "7 SNE" and "feature" column is "segment_num") indicate a control width for a feature value related to a number of lobulated segments of a neutrophil. According to the configuration, the user can optionally set the control widths for the feature values based on the indexes of the daily quality control at the testing facility, which can suppress a subjective judgment error between inspectors.

The image data that has an abnormal feature value, which is out of the feature value control width illustrated in FIG. 24 may be displayed in a different form from other image data IDs that have the normal feature values, like image data ID1, ID3, ID5, ID7, ID9, ID11, and ID13 among the plural image data displayed on the screen illustrated in FIG. 20. A method of displaying the image data in such a different form is arbitrary, but may include, for example, putting a colored frame only to the image data that has the abnormal feature value or displaying the image data that has the abnormal feature value larger than other image data that have the normal feature values on the screen.

Other Embodiments

The above embodiments are intended to facilitate understanding of the invention and are not to be construed as limiting the invention. The invention may be changed/improved (e.g., combining the embodiments, omitting some configurations of each embodiment) without departing from its intent, and the invention also includes equivalents thereof.

For example, the smear slide 10 is prepared by the smear preparing apparatus included in the testing systems 70-1 to 70-4, but the smear slide 10 may be prepared by a laboratory technician belonging to a testing facility. Also, the image(s) of the smear slide 10 is captured by the smear image capturing apparatus 40, but the image(s) of the smear slide 10 may be manually captured by a laboratory technician belonging to a testing facility.

The invention claimed is:

1. A system for generating quality control information for smears, comprising:
    a smear preparing apparatus configured to prepare a plurality of smears from samples;
    a smear image capturing apparatus configured to capture images of the plurality of smears; and
    a smear transporting apparatus configured to transport the plurality of smears to the smear image capturing apparatus;
    a computer communicably connected to the smear image capturing apparatus, the computer comprising a controller configured to perform operations comprising:
    obtaining image data including the images of the plurality of smears captured by the smear image capturing apparatus
    obtaining, from the image data comprising the images of the plurality of smears, feature values each of which reflects a staining state of each smear; and
    generating quality control information based on the feature values, wherein
    the feature values are obtained respectively from the plurality of smears at a certain facility.

2. The system according to claim 1, wherein the controller is configured to perform operations further comprising outputting a feature value that reflects a staining state of one or more smears that are objects to be controlled, and the quality control information.

3. The system according to claim 1, wherein the feature value of each of the plurality of smears comprises a value of color information that is obtained from red blood cells in the smear.

4. The system according to claim 1, wherein the controller is configured to perform operations further comprising:
    obtaining a second feature value corresponding to color information of white blood cells in each of the plurality of smears from each of the images of the plurality of smears; and
    generating second quality control information corresponding to the plurality of smears based on the second feature values.

5. The system according to claim 4, wherein the color information of the white blood cells comprises color information associated with at least one of nuclei, cytoplasm, and granules of the white blood cells.

6. The system according to claim 1, wherein the feature value of each of the plurality of smears comprises a value that is obtained from at least one of a color component, hue, saturation, and lightness obtained from the image of the smear containing blood cells, and a combination thereof.

7. A system for generating quality control information for smears, comprising:
    a smear preparing apparatus configured to prepare a plurality of smears from samples;
    a smear image capturing apparatus configured to capture images of the plurality of smears; and
    a smear transporting apparatus configured to transport the plurality of smears to the smear image capturing apparatus;
    a computer communicably connected to the smear image capturing apparatus, the computer comprising a controller configured to perform operations comprising:
    obtaining image data including the images of the plurality of smears captured by the smear image capturing apparatus
    obtaining, from the image data comprising the images of the plurality of smears, feature values each of which reflects a staining state of each smear; and
    generating quality control information based on the feature values, wherein
    the feature values comprise:
        a feature value that is obtained from at least one smear obtained at a first facility; and
        a feature value obtained from at least one smear obtained at a second facility.

8. The system according to claim 7, wherein
    the feature value that is obtained from the at least one smear obtained at the first facility comprises: feature values that are obtained respectively from a plurality of smears at the first facility; and
    the feature value that is obtained from the at least one smear obtained at the second facility comprises: feature values that are obtained respectively from a plurality of smears at the second facility, and
    the quality control information comprise:
    quality control information for the first facility that is generated based on the feature values of the first facility; and
    quality control information for the second facility that is generated based on the feature values of the second facility.

9. The system according to claim 7, wherein
the quality control information is generated based on the feature values comprising the feature value of the first facility and the feature value of the second facility.

10. The system according to claim 1, wherein
the quality control information comprises a statistic value that is calculated from the feature values.

11. The system according to claim 1, wherein
the quality control information comprises an upper limit value and a lower limit value that are generated based on a statistic value calculated from the feature values.

12. The system according to claim 2, wherein
the feature value reflecting the staining state of the one or more smears to be controlled is output so as to be identifiable whether the feature value reflecting the staining state of the one or more smears to be controlled is within a predetermined range.

13. The system according to claim 12, wherein
the feature value reflecting the staining state of the one or more smears to be controlled is a statistic value that is calculated from images of a plurality of smears to be controlled.

14. The system according to claim 1, wherein
the feature value of each of the plurality of smears is a statistic value that is calculated from a plurality of pieces of image data of the smear.

15. The system according to claim 1, further comprising
smearing a blood sample on a glass slide by a smear preparing apparatus, to thereby prepare each of the plurality of smears.

16. The system according to claim 15, wherein
the quality control information is generated based on the images of the plurality of smears that are prepared on a daily basis.

17. The system according to claim 1, wherein the controller is configured to perform operations further comprising:
outputting a screen that allows setting a control width for the feature values based on a user input.

18. The system according to claim 1, wherein
the feature value of each of the plurality of smears comprises a feature value that reflects a form of the smear.

19. An apparatus for generating smear quality control information comprising:
a controller that is configured to perform operations comprising:
obtaining image data including images, captured by a smear image capturing apparatus, of a plurality of smears prepared from samples by a smear preparing apparatus;
obtaining, from the image data, feature values each of which reflects a staining state of each smear; and
generating quality control information including at least one of an upper limit value and a lower limit value based on the feature values, wherein the quality control information including the at least one of the upper limit value and the lower limit value is automatically updated based on the feature values obtained, wherein
the feature values are obtained respectively from the plurality of smears at a certain facility.

* * * * *